(12) United States Patent
Bukary et al.

(10) Patent No.: US 7,725,947 B2
(45) Date of Patent: *May 25, 2010

(54) METHODS AND SYSTEMS FOR PROVIDING BENCHMARK INFORMATION UNDER CONTROLLED ACCESS

(75) Inventors: Roman Bukary, San Francisco, CA (US); Marcus Wefers, Heidelberg (DE)

(73) Assignee: SAP AG, Walldorf (DE)

( * ) Notice: Subject to any disclaimer, the term of this patent is extended or adjusted under 35 U.S.C. 154(b) by 335 days.

This patent is subject to a terminal disclaimer.

(21) Appl. No.: 10/899,152

(22) Filed: Jul. 27, 2004

(65) Prior Publication Data

US 2005/0071680 A1  Mar. 31, 2005

Related U.S. Application Data

(60) Provisional application No. 60/492,723, filed on Aug. 6, 2003.

(51) Int. Cl.
*H04L 9/32* (2006.01)
*H04L 12/22* (2006.01)

(52) U.S. Cl. .............................. 726/30; 713/193; 707/1; 707/100

(58) Field of Classification Search ...................... 705/7, 705/10–11, 22, 28, 30, 44, 404, 411; 726/27–30, 726/21; 713/165–167, 193
See application file for complete search history.

(56) References Cited

U.S. PATENT DOCUMENTS

| 5,245,638 | A | 9/1993 | Gustafson |
| 5,726,914 | A | 3/1998 | Janovski et al. |
| 5,737,494 | A | 4/1998 | Guinta et al. |
| 5,923,330 | A * | 7/1999 | Tarlton et al. ............... 345/419 |
| 6,484,182 | B1 * | 11/2002 | Dunphy et al. ................. 707/3 |
| 6,556,974 | B1 | 4/2003 | D'Alessandro |
| 2002/0099598 | A1 | 7/2002 | Eicher, Jr. et al. |
| 2002/0123945 | A1 | 9/2002 | Booth et al. |
| 2002/0129017 | A1* | 9/2002 | Kil et al. ........................ 707/6 |
| 2002/0174352 | A1* | 11/2002 | Dahl ........................ 713/193 |
| 2003/0004779 | A1 | 1/2003 | Rangaswamy et al. |
| 2003/0005135 | A1* | 1/2003 | Inoue et al. ................. 709/229 |
| 2003/0018513 | A1 | 1/2003 | Hoffman et al. |
| 2003/0040823 | A1* | 2/2003 | Harm et al. ................... 700/97 |

(Continued)

OTHER PUBLICATIONS

U.S. Appl. No. 10/835,318, filed Apr. 30, 2004, entitled "Methods and Systems for Providing Benchmark Services to Customers".

(Continued)

*Primary Examiner*—Jung Kim
*Assistant Examiner*—Venkat Perungavoor
(74) *Attorney, Agent, or Firm*—Finnegan, Henderson, Farabow, Garrett & Dunner LLP

(57) ABSTRACT

An electronic data structure comprises benchmark information and an authorizing section for access to said benchmark information. A method processes and stores data objects by means of one or more processes running in a computer system having one or more of the electronic data structures. A request for benchmark information is received from a second party, the request including identification information of the second party. The benchmark information is analyzed to determine whether it contains in its electronic data structures and whether the authorizing section of the electronic data structure includes the identification information. Based on the determination, the benchmark information is presented to the second party.

24 Claims, 10 Drawing Sheets

U.S. PATENT DOCUMENTS

| | | | |
|---|---|---|---|
| 2003/0056113 A1* | 3/2003 | Korosec | 713/200 |
| 2003/0083947 A1 | 5/2003 | Hoffman et al. | |
| 2003/0093340 A1 | 5/2003 | Krystek et al. | |
| 2003/0149884 A1* | 8/2003 | Hernandez et al. | 713/193 |
| 2003/0158749 A1 | 8/2003 | Olchanski et al. | |
| 2004/0032420 A1 | 2/2004 | Allen et al. | |
| 2004/0083222 A1* | 4/2004 | Pecherer | 707/100 |
| 2005/0038669 A1 | 2/2005 | Sachdeva et al. | |
| 2006/0212539 A1 | 9/2006 | Palevich et al. | |

OTHER PUBLICATIONS

U.S. Appl. No. 10/899,272, filed Jul. 27, 2004, entitled "Methods and Systems for Providing Benchmark Information Under Controlled Access".
Web.archive.org, PMGBenchmarking.com, Jun. 7, 2002, "Measure Your Performance", pp. 1-3.
"Dimensions: Executive Summary", Jul. 2000, The Performance Measurement Group, pp. 1-4.
Web.archive.org, PMGBenchmarking.com, Oct. 6, 2000, "Questions frequently asked by development professionals considering a subscriptions to the Product Development Benchmarking Series", pp. 1-4.
Web.archive.org, PMGBenchmarking.com Feb. 8, 2001, Supply-Chain Management Benchmarking Series—Tips & Slips, vol. 4: Subscriber Site Navigation, pp. 1-11.
Web.archive.org, PMGBenchmarking.com, Sep. 18, 2000, "Our Mission", pp. 1.
Web.archive.org, PMGBenchmarking.com, Dec. 6, 2000, "SAP Partnership", pp. 1.
Web.archive.org, PMGBenchmarking.com, Feb. 10, 2001, "SAP Partnership—Continuous Performance Assessments", pp. 1.
Web.archive.org, PMGBenchmarking.com, Feb. 8, 2001, Supply-Chain Management Benchmarking Series, pp. 1-3.
Web.archive.org, PMGBenchmarking.com, Feb. 8, 2001, Supply-Chain Management Benchmarking Series, pp. 1-3.
Prtm Press release "High Tech Management Consultants PRTM Launch Online Benchmarking Company", Mar. 1, 1999. pp. 1-2.
PRTM Press release "University of Michigan/OSAT and the Performance Measurment Group Launch a new Benchmarking Initiative for the Automotive Industry", Jan. 21, 2000, pp. 1-2.
PRTM Press release "New Survey Addresses Product and Marketing Management", May 21, 1999, pp. 1.
PRTM Press release "Fujitsu and PRTM/PMG Announce Supply-Chain Benchmarking and Consulting Collaboration in Japan", Mar. 1, 1999, pp. 1.
SAP Press release "Industry standard benchmarking program", Jan. 20, 2000, pp. 1.
PRTM Press release "The Performance Measurement Group Rolls out Product Development Benchmarking Series Online", Jun. 11, 1999, pp. 1-2.
PRTM Press Release "SAP and PMG Introduce Industry-specific Key Performance Indicators for Supply-Chain Operations", Jan. 31, 2000, pp. 1-2.
Web.archive.org, PMGBenchmarking.com, Feb. 8, 2001, "Supply-Chain Management Benchmarking Series", pp. 1-5.
Web.archive.org, PMGBenchmarking.com, Feb. 10, 2001, "SAP Partnership—Peformance Snapshots", pp. 1-2.
Web.archive.org, PMGBenchmarking.com, Jun. 2, 2002, "Signals of Performance", pp. 1-2.
Web.archive.org, PMGBenchmarking.com, Jun. 8, 2002, "Webcasts", pp. 1-5.
Web.archive.org, PMGBenchmarking.com, Feb. 8, 2001, "SAP Partnership—Product Offerings and Credentials", pp. 1.
Web.archive.org, PMGBenchmarking.com, Feb. 10, 2001, "SAP Partnership—a research note published by AMR on the PMG/SAP Alliance", pp. 1-5.
Web.archive.org, PMGBenchmarking.com, Dec. 6, 2000, "Product Development Benchmarking Series", pp. 1-2.
Web.archive.org, PMGBenchmarking.com, Dec. 5, 2000, "Supply-Chain Management and Product Development Benchmarking Series", pp. 1-2.
Web.archive.org, PMGBenchmarking.com, Dec. 6, 2000, "Supply-Chain Management Benchmarking Series", pp. 1-2.
Web.archive.org, PMGBenchmarking.com, Feb. 8, 2001, "Supply-Chain Management Benchmarking Series—Tips & Slips, vol. Three: Plan Survey FAQ's", pp. 1-6.
Web.archive.org, prtm.com, Jan. 17, 1998, "Benchmarking Studies by PRTM", pp. 1-4.
Web.archive.org, supply-chain.org, Dec. 5, 1998, "Supply Chain Letter", pp. 1-12.
PCT International Search Report and Written Opinion for International Application No. PCT/US04/22308, Oct. 24, 2006 (10 pages).
Supply & Demand Chain Executive, May 14, 2004, "The Hackett Group, PMG Ally for Supply Chain Benchmarking Services" http://sdcexec.com/article_arch.asp?article_id=5563 (2 pages).
DM Review, May 2004, "The Hackett Group and The Performance Measurement Group Announce Alliance for Supply Chain Benchmarking Services" http://www.dmreview.com/article_sub.cfm?articleId=1003565 (1 page).
Press Release, May 13, 2004, "The Hackett Group and PRTM's Benchmarking Subsidiary, The Performance Measurement Group (PMG), Announce Alliance for Supply Chain Benchmarking Services", http://www.answerthink.com/04_news/01_press/pr_2004/pr_05132004_01.htm, (3 pages).
"Business Benefits of mySAP SCM: Supply Chain Planning Benchmark Study" http://www.sap.com/solutions/business-suite/scm/businessbenefits/benchmarkimeox (1 page).
"Supply Chain Planning Benchmark Survey", http://www.sap.com/netherlands/industries/consumer/pdf/Benchmark_survey_50056494.pdf (6 pages).
"SAP and Pmg Introduce Industry-Specific Key Performance Indicators for Supply-Chain Operations", http://www.pmgbenchmarking.com/public/news/pr_sap.asp (3 pages).
"Supply Chain Planning Benchmarking Study", http://www.pmgbenchmarking.com/public/product/scorecard/supply_chain/sap_planning.aso (2 pages).
"Supply-Chain-Letter", Mar. 2003, http://www.supply-chain.org/galleries/default-file/March_ SCCNewsletter%202003.pdf (8 pages).
Intelligent Enterprise, May 2004, "Alliance for Supply Chain Benchmarking Services", http://www.intelligententerprise.com/channels/applications/showArticle.jhtml?articleID=20301084 (2 pages).
"Collaborative Supply Management", http://www50.sap.com/businessmaps/91039FACE53F11D3874B0000E820132C.htm (2 pp.).
http://www.couponmonth.com/paoes/allabout.htm (3 pages).
Rakowski, James P. Southern, R. Neil; Jarrell, Judith L; "The changing structure of US Trucking Industry: Implications for Logistics Managers", 1993, Vol. 14, Issue 1; pp. 111, ProQuest ID 573892 (9 pages).
Wright, Christine M.; Hu, Michael Y.; Booth, David E.; "Effectiveness of joint estimation when the outlier is the last observation in a time series", Summer 1999, Decision Sciences, vol. 30, Iss 3, p. 825, ProQuest ID 49625285 (13 pages).

* cited by examiner

METHODS AND SYSTEMS FOR PROVIDING BENCHMARK INFORMATION UNDER CONTROLLED ACCESS

This application claims benefit of priority from U.S. Provisional Application No. 60/492,723, entitled "Methods and Systems for Providing Benchmark Information Under Controlled Access," filed Aug. 6, 2003, the disclosure of which is Expressly incorporated herein.

The present application also relates to U.S. patent application Ser. No. 10/899,272, entitled "Methods and Systems for Providing Benchmark Information Under Controlled Access," the disclosure of which is also expressly incorporated herein.

FIELD OF THE INVENTION

The present invention relates to electronic data processing. More particularly, the present invention relates to methods and systems for exchanging benchmark information, such as benchmark data and/or benchmark definitions.

BACKGROUND OF THE INVENTION

Generally, a benchmark (BM) is a point of reference by which something can be measured. For example, in surveying a field, a "bench mark" (two words) is a post or other permanent mark established at a known elevation for serving as the basis for measuring the elevation of other topographical points. In the economic environment, such as in computer and Internet technology, the term "benchmark" may mean any of the following:

- A set of conditions against which a product or system is measured. For example, PC magazine laboratories frequently test and compare several new computers or computer devices against the same set of application programs, user interactions, and contextual situations. The total context against which all products are measured and compared may be referred to as the benchmark.
- A program designed to provide measurements for a particular operating system or application.
- A known product having acceptance in the marketplace for comparison to newer products.
- A set of performance criteria for a product.

As used herein, the term "benchmark" encompasses any set of standards or averages by which similar items can be compared or analyzed. Benchmark definitions comprise measures or rules for calculating and interpreting benchmark data.

Benchmark data has become a critical input factor for performance measurement and strategy management of businesses. This information is not only used for measurement purposes, but also essential to enable a meaningful business planning. Companies need quality information about their competitors, suppliers, industry, products, and markets, for example. Benchmarks can be useful to satisfy such needs, and some companies offer benchmark programs capable of downloading benchmark testing services through a own web site.

Benchmark definitions and data exist in the economy on a horizontal level, e.g., for areas like human resources, and on a vertical level, e.g., focused on industry, products, services, performances. Benchmarks are hereinafter alternatively referred to as "measures."

However, if a company intends to perform benchmark analyses for its products or services or its performance with respect to other companies or organizations, the company must either obtain the benchmark definitions or data on its own or consult a benchmark provider. This is a time consuming task even if the company uses business software for supporting its business processes. It is an especially time consuming task if the company itself performs the task.

Other difficulties also exist for companies that require benchmark data. For example, compatibility problems may arise if the data is incorporated into the company's business software, because each benchmark provider uses its own data format, which may not always match the company's software. A further problem arises if the company is potentially willing to distribute its benchmark data or to allow others to distribute it. In such cases, the company cannot be certain that the data will not be given to persons or companies that are unauthorized to receive the benchmark data. Finally, a company interested in managing and tracking aggregated performance of their suppliers via benchmark data must undertake a manual, labor-intensive process of requesting, aggregating, normalizing (e.g., for a single currency or a uniform time period), and distributing the necessary data.

Accordingly, there is a need for improved systems and methods for providing benchmark services. For instance, there is a need for improved systems and methods that may provide an easy, secure, and portable exchange of benchmark information with a company's business software.

SUMMARY OF THE INVENTION

Consistent with embodiments of the present invention, systems and methods are disclosed for providing an electronic data structure for benchmark information. Embodiments of the invention may include an electronic data structure including an authorizing section relating to accessibility of the benchmark information.

In accordance with an embodiment of the invention, systems and methods may use the electronic data structure in data processing. This may allow the benchmark information to be easily exchanged between, for example, benchmark users and providers. The electronic data structure may solve the technical problem of establishing an easy path for exchanging electronic data on benchmarks between two computer systems to ensure only authorized persons may access specific benchmark information. The authorizing section solves the latter problem by defining a relation between specific benchmark information and identification information (identifier), which represents a specific person (entity). The authorizing section indicates which external entities may have access to which benchmark information.

The authorizing section may be implemented by a parent-child block, which may be referred to as a "PC block." The PC-block can have "Parent-Child" relationships, which may identify a "parent" or higher-order entity associated with the current entity and a "child" or lower-order entity associated with the current entity. Other entities can have a parent and a child status simultaneously. The PC-Block may also identify a "sibling" or peer-level entity whose BM may not be rolled-up or down to parents or children, respectively, but whose BM may be shared in aggregate with other "siblings."

The PC block may support multiple "parents," multiple "children," and multiple or potentially universal "sibling" entities and can include references to a BM section to define which information may be shared with which entities "above" and "below" the current entity.

The parent-child references can be based on identifiers comprising unique company codes, which may be issued, for example, by a benchmark provider (BM portal, market place) administration facility. Such codes can be designed to be unique and expandable. When one company acquires another, the initial identifier can be "expanded" to cover both organizations. The PC block may by default assure maximum access restriction. In other words, without explicitly granting permissions, all access to benchmark information by other entities may be denied. The PC block may support business rule definitions and administration that controls the parent child relationships. For example, a parent entity may have access to benchmark information of all its "child" entities, while "siblings" may or may not have access to each other's benchmark information. Access may depend on the business rules and specific settings.

The following elements may also be included in the electronic data structure:

- A program for providing measurements for a particular operating system or application.
- A header section, which may include personally identifiable (PII) and non-PII information about the organization submitting the benchmark data, such as user name, company name, address data, etc.
- A footer section, which may include a checksum validation that the message and included data is complete and finalized.
- A BM body section, which may comprise specific BM data elements with unique identification tags.

In accordance with another aspect of the present invention, as embodied and broadly described herein, methods and systems consistent with the principles described in this specification provide a method for processing electronic data structures. Such methods and systems may be implemented on a computer system of a first party having one or more of said electronic data structures. The implemented method comprises: receiving a request for a benchmark information from a second party, where request includes an identification information for the second party; determining whether the benchmark information is in the electronic data structure and whether authorizing section of the electronic data structure includes the identification information; and, based on the determination, presenting the benchmark information to the second party.

The invention and its embodiments are further directed to a computer system, a computer program, a computer readable medium and a carrier signal comprising instructions for processing data according to the inventive method and in its embodiments, respectively.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the invention. In the drawings.

DESCRIPTION OF THE EMBODIMENTS

Figure 1A:
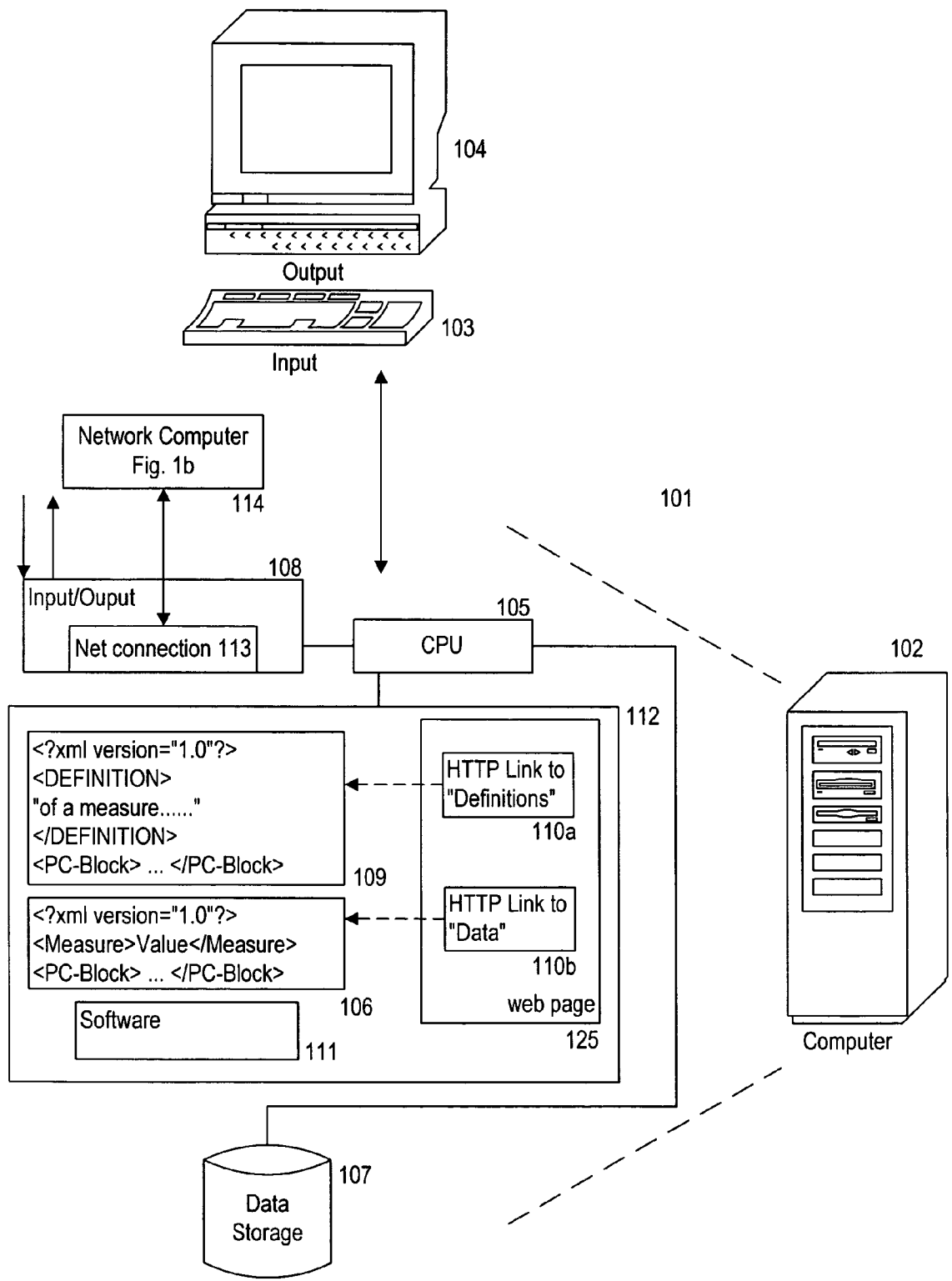
FIGS. 1a and 1b are exemplary diagrams illustrating an implementation of an electronic data structure within a computer system.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Computer systems and programs may be closely related. As used herein, the phrases "the computer provides," "the program provides or performs specific actions," and "a user performs a specific action" express actions by a computer system that may be controlled by a program or express that the program or program module may be designed to enable the computer system to perform the specific action or to enable a user to perform the specific action by means of a computer system.

It should be understood that the term "presentment" as used herein broadly refers to the specialized definition normally associated with commercial paper (i.e. the production on a negotiable instrument to a drawee), as well as to providing information via electronic means. For example, this electronic presentment may be through the use of an Internet or intranet website or via e-mail or SMS, e.g. by making a web site accessible to one or more persons. Electronic presentment may also take place by sending computer readable storage media, like disks, ZIP disks, magneto-optical disks, CDs, CD-R/W discs, DVD ROMs, etc., via standard mail.

Within the concept of this specification, the terms used shall have their usual meaning in the context of the field of data processing, unless defined otherwise herein.

A computer system broadly refers to any stand-alone computer, such as a PC or a laptop, or a series of computers connected via a network, such as a network within a company, or a series of computers connected via the Internet.

A data structure broadly refers to a specialized format for organizing and storing data. Data structure types include an array, file, record, table, or tree, for example. Such data structures may be designed to organize data to suit a specific purpose so that it may be accessed and used in appropriate ways. In computer programming, a data structure may be selected or designed to store data for the purpose of working on it with various algorithms. Within this specification, an electronic data structure is a data structure stored on a volatile or nonvolatile memory or embedded in a carrier signal and accessible by a computer system.

The term business software broadly refers to software, software applications, programs, or program modules, which may support an entity's business processes.

SGML (Standard Generalized Markup Language) is a standard for specifying a document markup language or tag set. Such a specification is itself a document type definition (DTD). SGML is not in itself a document language, but a description of how to specify one. It may also be referred to as metadata. SGML is based on the idea that documents have structural and other semantic elements that can be described without reference to how such elements should be displayed. The actual display of such a document may vary depending on the output medium and style preferences. Some advantages of documents based on SGML are: (1) they may be created by thinking in terms of document structure rather than by appearance characteristics (which may change over time); (2) they may be more portable because an SGML compiler can interpret any document by reference to its document type definition (DTD); and (3) documents originally intended for the print medium may be easily re-adapted for other media, such as the computer display screen.

The language that a Web browser uses, such as Hypertext Markup Language (HTML), is an example of an SGML-based language. XML is another example of an SGML-based language. A document type definition exists for HTML, and by reading an HTML specification, one is effectively reading an expanded version of the document type definition.

XML (Extensible Markup Language) is a flexible way to create common information formats and share both the format and the data on the World Wide Web, intranets, and elsewhere. Any individual or group of individuals or companies may use XML to share information in a consistent manner.

XML, a formal recommendation from the World Wide Web Consortium, is similar to the Hypertext Markup Language. Both XML and HTML use markup symbols to describe the contents of a page or file. HTML, however, describes the content of a Web page (mainly text and graphic images) in terms of how it is to be displayed and interacted with. Thus, an XML file may be processed as data by a program or it can be stored with similar data on another computer or, like an HTML file, it can be displayed.

XML may be considered "extensible" because the markup symbols are unlimited and self-defining. XML may be considered a simpler and easier to use subset of the Standard Generalized Markup Language, which is the standard for creating a document structure. HTML and XML may be used together in many Web applications. XML markup, for example, may appear within an HTML page.

A first embodiment of the electronic data structure is characterized in that the authorizing section comprises a parent child block comprising one or more of the following entries: a description of an entity, a start authorized access date, an end authorized access date, a description field, a check-sum block, a default identifier, and an authorized content.

The term "entity" refers to a name or description of a company or person having controlled access to benchmark information. The entity may be described by identification information (an identifier) designed for the respective company or person. A start authorized date may be a date from which the respective entity may have access to the specified benchmark information. The end authorized date may be the respective end date. Both dates may be used as further conditions for obtaining access to the benchmark information (e.g., the actual date is between both dates for granting access). A description field is a field for comments. The authorized content section may specify the benchmark information accessible by an entity. A check-sum value may be a mathematical sum of BM identifiers combined with parent and child identifiers. The check-sum value may be used to control whether changes have been made in the electronic data structure and may ensure that the transmitted and received files are complete and accurate. The PC-block may contain one or more of the above entries.

An alternative embodiment of the electronic data structure is characterized in that the electronic data structure may be a file having a format readable by a SGML-based language. A still further embodiment is characterized in that the electronic data structure file is an XML or HTML file.

Generally, the electronic data structure and the authorizing section are part of a benchmark exchange message. The message may be encrypted based on a user's specified requirements. For implementing the authorizing section PC block, exemplary pseudo-code in XML format is listed below using benchmark data as example for benchmark information.

PC blocks may have a consistent data structure, such as having data arranged in the following order: an entity, a start authorized access date, an end authorized access data, a description, and authorized content.

The PC block may include, in addition to parent and child information, a check-sum block to eliminate encoding errors as well as any accidental disclosures. The check-sum block may be a mathematical sum of unique BM identifiers combined with unique parent and child identifiers. Character combinations like "UniSib000" may be a default file identifier for a universal sibling—permitting access to specified information by any participating peer-level entity.

In the examples below, the following conventions are used: C1, C2, Cn are references to single (parent-level) entities viewed at peer-level; and S1, S2, Sn are children entities associated with the C1 identified in the <Parent> portion of the PC block.

Case I (default case, in which access granted only to the current entity):

```
<XML>
...
<Benchmark data>
         <BM1> Value1 </BM1>
         <BM2> Value2 </BM2>
         <BM3> Value3 </BM3>
</Benchmark data>
...
<PC Block begin>
<Parent>
C1    00-00-0000 00-00-0000 <self-reference>
      BM1
      BM2
      BM3
</Parent>
<Sibling>
C1    00-00-0000 00-00-0000 <self-reference>
      BM1
      BM2
      BM3
</Sibling>
<Children>
      C1      00-00-0000 00-00-0000 <self-reference>
      BM1
      BM2
             BM3
</Children>
Check-sum value
</PC Block>
...
</XML>
```

Case II (single parent case, in which access is granted to current entity and parent C2):

```
<XML>
...
<Benchmark data>
        <BM1> Value1 </BM1>
        <BM2> Value2 </BM2>
        <BM3> Value3 </BM3>
</Benchmark data>
...
<PC Block begin>
<Parent>
C1    00-00-0000 00-00-0000 <self-reference>
    BM1
    BM2
    BM3
</Parent>
<Sibling>
C1    00-00-0000 00-00-0000 <self-reference>
    BM1
    BM2
    BM3
C2    17-03-2003 12-31-2999 <peer access>
    BM1
</Sibling>
<Children>
    C1    00-00-0000 00-00-0000 <self-reference>
    BM1
    BM2
        BM3
</Children>
Check-sum value
</PC Block>
...
</XML>
```

Case III (single child case, in which access is granted to current entity and to a single child):

```
<XML>
...
<Benchmark data>
        <BM1> Value1 </BM1>
        <BM2> Value2 </BM2>
        <BM3> Value3 </BM3>
</Benchmark data>
...
<PC Block begin>
<Parent>
C1    00-00-0000 00-00-0000 <self-reference>
    BM1
    BM2
    BM3
</Parent>
<Sibling>
C1    00-00-0000 00-00-0000 <self-reference>
    BM1
    BM2
    BM3
</Sibling>
<Children>
    C1    00-00-0000 00-00-0000 <self-reference>
    BM1
    BM2
    BM3
S1    17-03-2003 12-31-2999 <child access>
    BM2
</Children>
Check-sum value
</PC Block>
...
</XML>
```

Case IV (generic case, in which access is granted to all "siblings" and single child):

```
<XML>
...
<Benchmark data>
        <BM1> Value1 </BM1>
        <BM2> Value2 </BM2>
        <BM3> Value3 </BM3>
</Benchmark data>
...
<PC Block begin>
<Parent>
C1    00-00-0000 00-00-0000 <self-reference>
    BM1
BM2
BM3
</Parent>
<Sibling>
C1    00-00-0000 00-00-0000 <self-reference>
    BM1
    BM2
    BM3
UniSib000 17-03-2003 12-31-2999 <generic>
        BM1
        BM2
        BM3
</Sibling>
<Children>
        C1    00-00-0000 00-00-0000 <self-reference>
        BM1
        BM2
        BM3
S1    17-03-2003 12-31-2999 <child access>
    BM2
</Children>
Check-sum value
</PC Block>
...
</XML>
```

A first embodiment of the present invention is characterized by presenting the benchmark information by electronic means. The electronic means may comprise the Internet, for example, where a link to the electronic data structure is presented on an Internet page. According to a second embodiment, the electronic data structure may be encrypted prior to presenting it. According to a third embodiment, personally identifiable information in the electronic data structure may be removed prior to presenting the data structure.

A further embodiment may comprise updating a resource or database with benchmark information, whereby the resource or database resides outside of the control of the first and/or the second party. This may enable continuous presentation of benchmark data upon valid requests, although benchmark data may be submitted on only a periodic basis.

A further embodiment may comprise selecting benchmark information stored in a resource or database, and writing the selected benchmark information into a further electronic data structure for presentation to a second party. The selection may be performed by means of a reference that points to the storage location of the benchmark information.

A still further embodiment of the method may comprise sending the electronic data structure by using the http, streaming, or ftp protocol. Similar data transfer protocols may also be used.

The invention is now described in more detail by way of reference to the following exemplary embodiments and examples shown in the drawings.

Figure 1B:
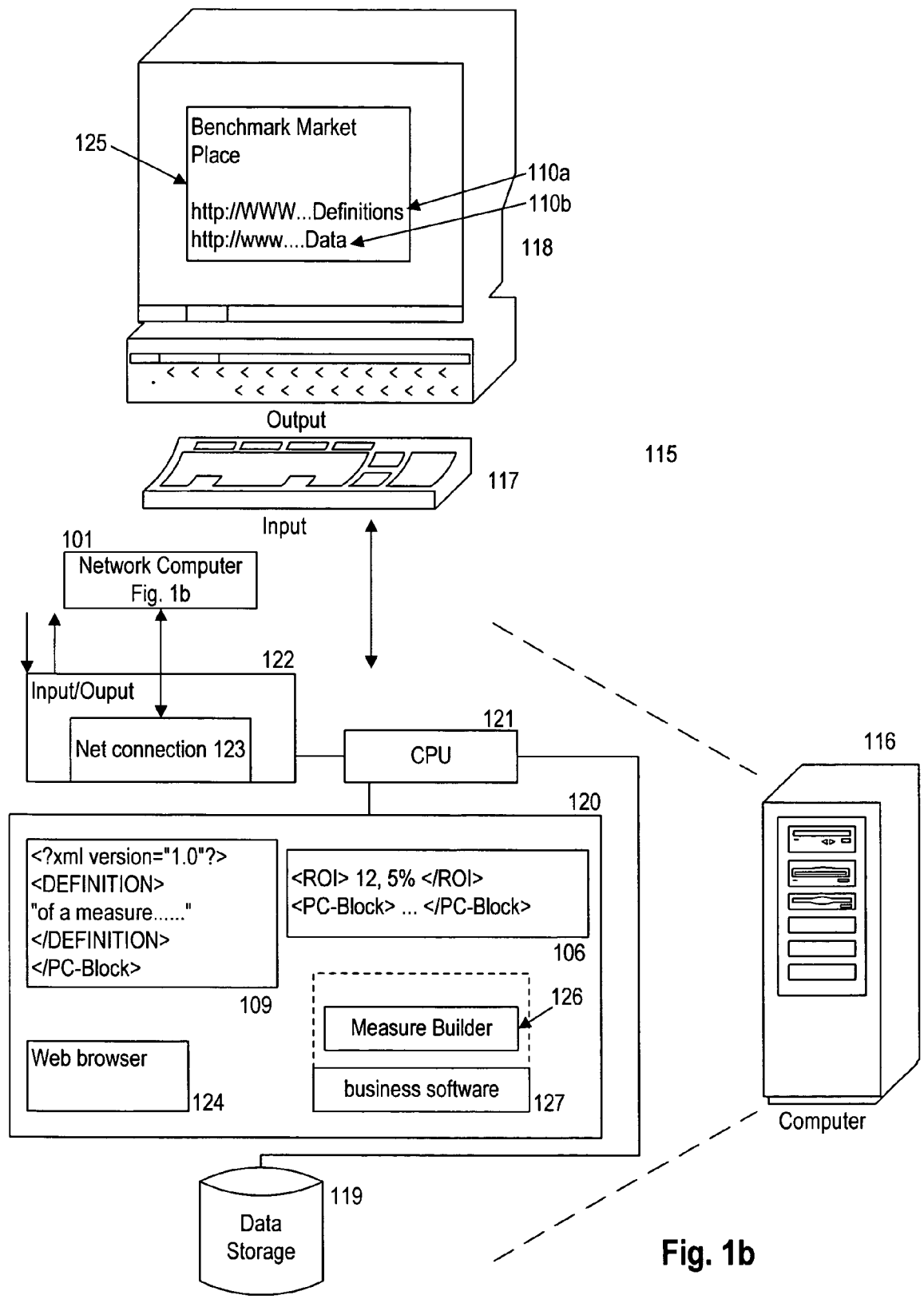

FIGS. 1a and 1b show an example of an implementation of an embodiment of the invention where a computer system 101 is connectable to a computer system 115. FIG. 1 a shows a computer system 101 comprising a computer 102, which includes a CPU 105 and a working storage 112 (memory) in which software applications are stored for being processed by CPU 105. Such a software application can be business software 111, for receiving creating and presenting of the electronic data structures, such as a file 106 comprising benchmark data and a PC-block and a file 109 comprising definitions of benchmarks and a PC-block. Files comprising BM data, PC-block and BM definitions are possible as well. Computer system 101 and software 111 can provide or be part of a benchmark marketplace. Computer system 101 further comprises input means 103 and output means 104 for interacting with a user, such as for starting programs and/or data input and/or output. Computer system 101 further comprises general input/output means 108, including a network connection 113 for sending and/or receiving data, such as data to establish a net connection with one or more further computer systems 114, or for sending or receiving of files like the files 106, 109 to or from other parties. A plurality of computer systems such as computer system 101, particularly a computer system 115 as shown in FIG. 1b, can be connected via the network connection 113 in the form of the network 114. In such a case, the network computers 114 can be used as further input/output means, including being used as further storage locations. For storing data, computer system 101 comprises a nonvolatile storage means 107. FIG. 1b shows the computer system 115 connectable to computer system 101 of FIG. 1a. Computer system 115 comprises a computer 116 having a CPU 121, a working storage 120 (memory) in which software applications are stored for being processed by CPU 121, general input/output means 122, including a network connection 123 for sending and/or receiving data and for a network connection to other computer systems, particularly to computer system 101 of FIG. 1a. Computer system 115 further comprises input means 117 and output means 118 for interaction with a user, such as for starting programs and/or data input and/or output, and a nonvolatile storage means 119.

Within the hardware example of FIGS. 1a and 1b, the data structures 106, 109 are first installed on the computer system 101. Links 110a, 110b are sent to computer system 115, or can be incorporated into one or more web pages 125, and enable a second party to download and/or display (receive) the files 106, 109 by means of computer system 115 via a web browser 124 when system 115 is connected to computer system 101. The links 110a, 110b and the files 106, 109 can alternatively be sent to another third party by other electronic means, like email, or SMS.

A user of computer system 115, such as a company C1 can access the benchmark market place 125 via web browser 124. After C1 is authenticated in the market place system 101 software 111 compares the authentication data with the information contained in the PC-blocks of the various benchmark data files 106 and 109 and offers such data to C1, which C1 is allowed to have access to for selection and download.

Figure 1C:
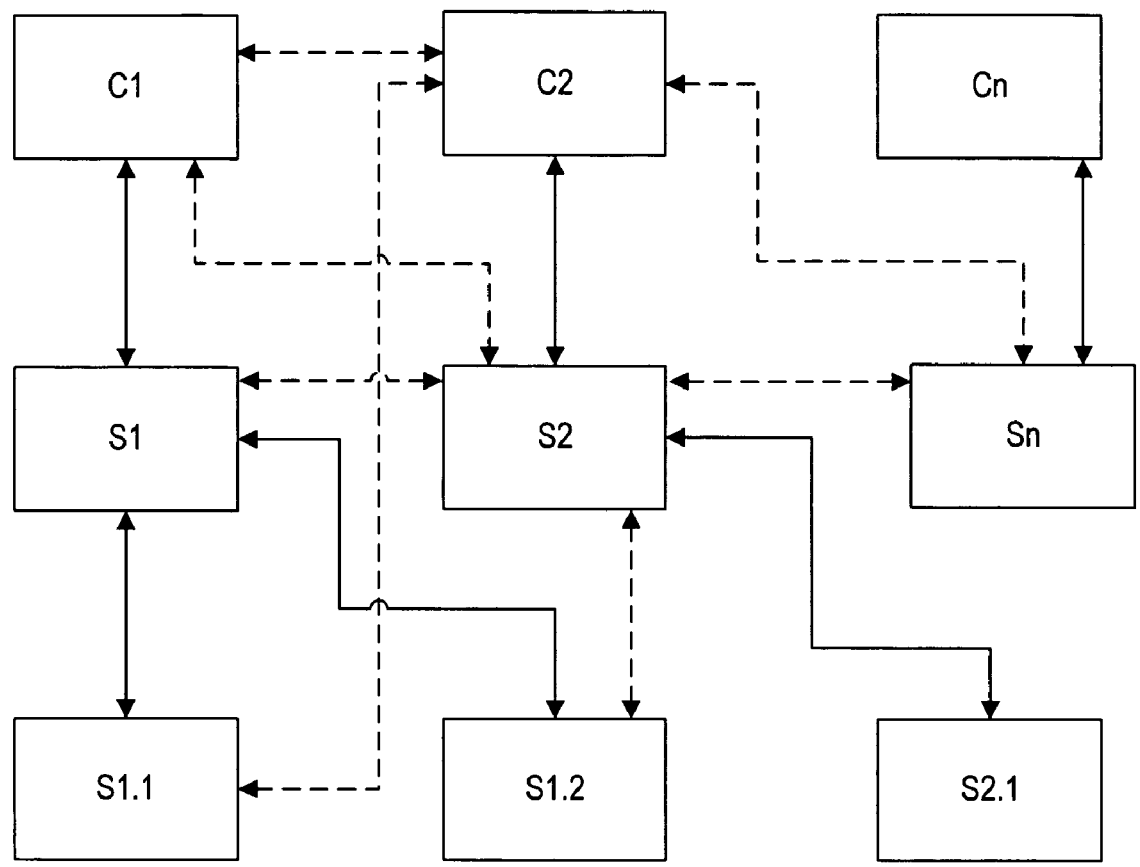
FIG. 1c is an exemplary diagram illustrating a parent child relationship between users of benchmark information.

FIG. 1c shows an example of a system of entities, comprising companies C1 to Cn and their respective supplier companies S1 to Sn, who have suppliers S1.1 to S1 .n, to Sn.1 to Sn.n. Accordingly, C1 is a parent to S1, which is a parent to S1.1 and S1.2. Vice versa, S1.1 is a child to S.1, who is a child to C1. Further, C1 and C2, Cn are siblings as well as S1 to Sn etc. Further analogous hierarchical levels are also possible. The lines between the entities reflect that the respective entities can share BM data. Solid lines represent the initially established relationships, which clearly delineate between multiple levels, the dashed-lines represent an emerging ecosystem where no clean hierarchies remain. As a result, the PC block thus grows and accommodates the evolving relationships.

For example, initially, S1 will report up to C1 and request information from S1.1 and S1.2. Over time, S1 will report to S2 and S1.1 will request information from C2 where an initially higher node C2 has now become a sub-supplier to S1.1, thereby remaining C2 but also acquiring a new designation S1.1.1 in the information flow diagram. In the illustration above if C1, C2, and C wanted to share or compare information they would either explicitly need to designate that intention or include a universal sibling reference within the content of their PC block. The parent-child references are based on unique company codes issued an administration facility of computer system 101, such as, in this example, a module of software 111 that is not transferable although it may be expandable. When one company acquires another, the initial identifier may be "expanded" to cover both organizations. The PC block can provide a maximum access restriction. In other words, without explicitly granting permissions, all access to information is denied except to self.

Figure 1D:
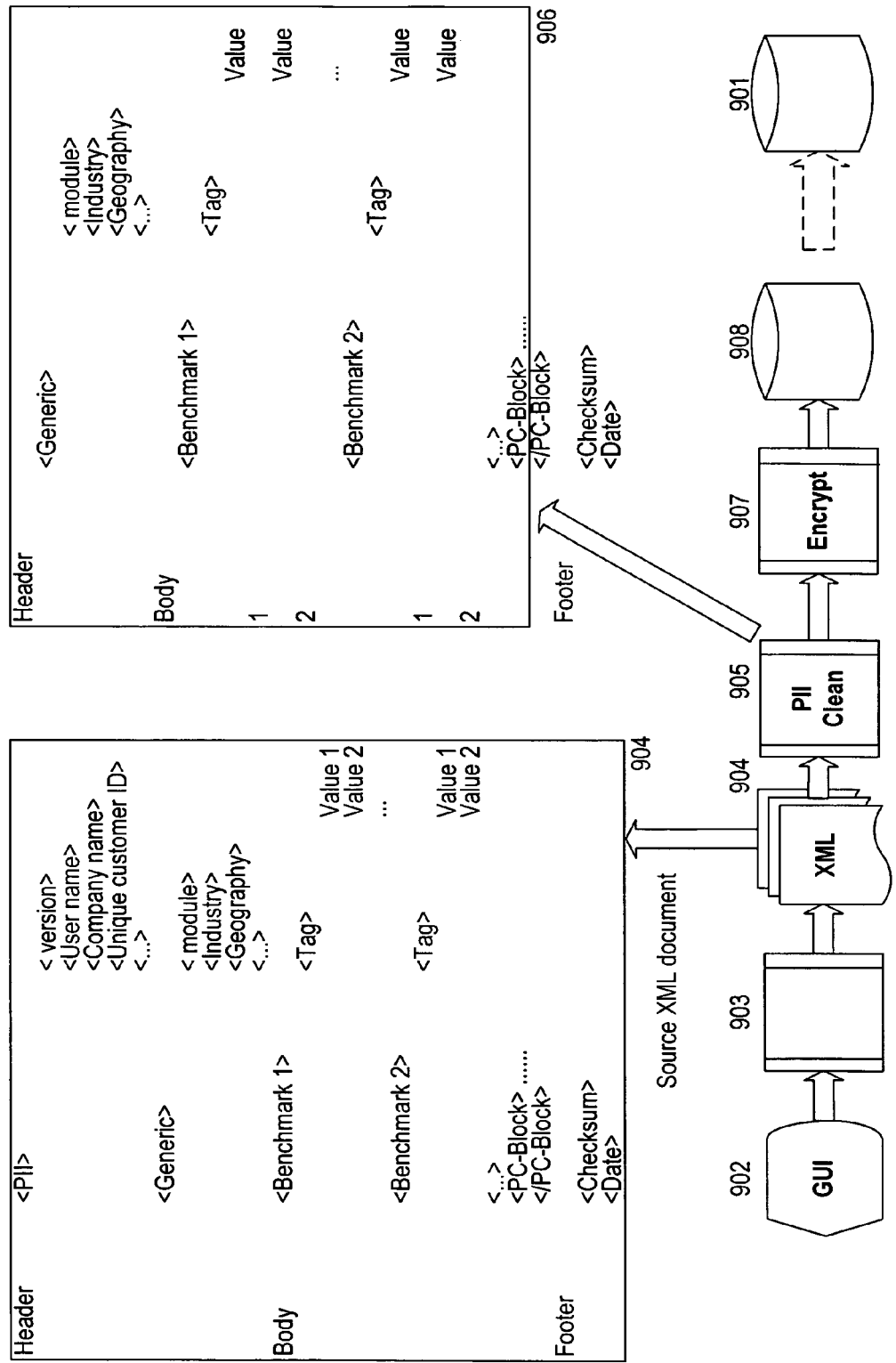
FIG. 1d is an exemplary diagram illustrating the creation of an exemplary electronic data structure.

FIG. 1d shows an example of a process comprising a set of steps 902, 903, 905 of generating an electronic data structure like file 106. In a software environment, such as a business software application within a company, a user can select via a graphical user interface (GUI) 902 business data that can be used as basis for benchmark data. A software component 903 generates from that selected business data one or more benchmark data and stores that generated benchmark data including the PC-Block in one or more XML-documents 904. Such documents 904 may comprise a header section comprising generic data like type software module, which generated the document, type of industry the company belongs to, geographic information, for example, and eventually PII data. Benchmark data and the PC-block are located n a body section. A footer section comprises a check-sum value and a date. The information, in which values for entities are possible entries of the PC-Block, can be requested from the benchmark provider or the benchmark market place to whom the documents 904 are sent for presentation to others. After the generation steps, a further software module 905 eventually performs a PII cleaning step, which means that any PII information eventually contained in the document 904 is striped off. This step ensures the anonymity of the benchmark data. Subsequently, the documents 904 are encrypted in a further step 907 and stored in database 908. Steps 902 to 903 can be performed, for example, within a software environment of one company. The result of these steps is a benchmark document 904. This document can be sent to a third party, such as a benchmark provider or a benchmark market place for further processing and/or presenting to others. The PII clean step 905 and encryption can then be performed by the third party, e.g. the provider or the marketplace. However, steps 902 to 907 can also be performed within one company. In such case, documents 904 can be stored in data base 908 with additional attributes, which will not be used when forwarding the documents 904 to a "central BM clearinghouse" 901, where the accumulated BM data may be stored. Central clearinghouse 901 may be an internal database or may be under the control of an outside third party. In either case, the entity may become the broker of the benchmark information stored in clearinghouse 901 for authorized re-distribution of the benchmark information to appropriate recipients thereby introducing a central clearinghouse model for BM collection and re-distribution. The additional attributes can be a creation date and "push date." Creation date can be the date the file was created, the "push date" can be the date the BM data can be transmitted to the third party, which may be immediate or it may introduce an artificial delay such as 24 hours, 30 days, or 89 days to permit various business processes.

After download or receipt of selected files 106, a business software 127 can read the received benchmark data and present it to the user and/or import it into its database.

After download of selected files 109 a software application 126 (hereinafter referred to as "measure builder") can read the definition file 109 and recognizes one or more key words for benchmark definitions. The definition identifies information about how to calculate the benchmark data. The measure builder then writes the information, identified by one or more of said key words, into a database structure for access to software 127, which calculates and/or further processes benchmark data according to the benchmark definition. A user can select which benchmark definitions to incorporate into software 127. If the benchmark definitions are used by software 127 to calculate benchmark data, the calculated benchmark data may be based on business data of the respective company, which uses the system and which are contained in or accessible by software 127. The measure builder 126 can be part of the software 127. To correctly recognize the benchmark definitions in file 109, the measure builder can have a list of valid benchmark definitions.

The following sections describe examples of further implementations of the described invention and its embodiments and possible interactions of a user with a computer system without limitation of the invention in any kind.

Terms used:

| | |
|---|---|
| Benchmark provider | A company that offers services to customers such as benchmark data, and benchmark definitions (measures) participation in benchmark studies, consulting, advanced analysis of benchmark data |
| Measure builder | Software application for the definition, description and analysis of measures (benchmark definitions). The application offers in further implementations the maintenance and analysis of benchmark data as well. |
| Measure Catalog | Customer defined catalog of measures maintained by the measure builder. A ready to use measures Catalogs is referred to as "Business Content" |

To satisfy the needs of parties, which use the systems, methods or computer programs according to the present specification, systems, methods or computer programs may have additional features as described in the following sections. Thus, the invention further comprises a method or module for incorporating external benchmarks into strategy management and performance measurement processes or applications of customers.

The invention further comprises a method or module for the investigation of industry standard measures. This process can be supported by one or more measure catalogs (so-called delivered Business Content) or measure listings of benchmark providers, which have experience in the respective industry or area.

The invention further comprises a method or module for the identifying a subset of those measures meaningful for the company.

The invention further comprises a method or module for identifying appropriate benchmark provider for a respective area by industry, country, product, or process.

The invention further comprises a method or module to make benchmark data available for analysis and comparison of actual and plan data against best-in-class, industry average, competitors. The availability of benchmark data for the analysis can be implemented in the following ways.

By transferring external benchmark data from benchmark provider into a benchmark storage enables the customer to use them within analytical applications such as a balanced scorecard, management cockpit, value driver trees, business planning & simulation, reporting, financial analytics, customer relationship management analytics, SCM analytics or human capital management analytics.

Accessing data directly via web-based services allows a benchmark provider the ability to offer in-depth analytical services based on their large benchmark data base. Alternatively, a provider may offer their data plus analytical tools via CD delivery for viewing at the customer site.

The invention further comprises a method or module for submitting data to benchmark provider for participation in provider supported survey. This includes the administration and creation of the exchange document based on pre-configurable queries for standard measures.

The invention further comprises a method or module or a further means for enabling the listing of benchmark providers, which supports certain measures. Filters for benchmark provider may be available to provide overview of measure coverage on a provider basis.

The list of providers may be accessible in a convenient location, ideally linked from the measure builder or directly from a web page.

The invention further comprises a method or module or a means for enabling a customer to access a central place (e.g. internet market place), which provides information about benchmark providers that work with certain companies, scope of offering, category of offering (country, industry, special area, validity), web page and license information.

The provider list can be sorted by certain criteria such as industry, country or validity by further.

Information about packages that are available for download into a customer's business software (Customer BS) system may be contained in the provider web page. The user can review those package offerings directly on the web page of the provider and select a package. Such provider web page can be easily accessible.

To provide a legal basis for the relation between a provider and a customer, a license agreement may be signed directly between the customer and the provider. This agreement can define, for example, a package, the number of users, fees and validity.

The invention further comprises a method or module or a further means that enables the identification of users. If named users are required, an easy to use method is provided to the user for communicating the names to the provider, who in return will submit password information directly to the user.

Some benchmark providers may require their customer to supply data prior to access information. This can be an extremely labor-intensive process, which can be shortened significantly by using data collection capabilities and predefined content. The following features support these requirements/specifications: means for enabling a user to select a survey directly from benchmark provider web page; means for enabling a review of measures prior to transfer to provider; means for transferring data to provider in an easy and secure fashion, e.g. by https encryption; and means for providing a transfer receipt to be sent from the provider to the user.

For retrieving benchmark data from provider to a customer's business software system, the invention further comprises a method or module or a means for:

logon handling of provider website;

marking measures or grouping in categories;

enabling secure transfer;

the import of data into customer's business software system, supported by validation check and having viewing capability prior to update;

viewing the history of benchmark transfers.

For application and embedding of external benchmarks, the invention further comprises a method or module or a means for:

reporting of benchmark data in measure builder;

using external benchmarks for analysis with customer's business software, wherein drill-down reporting for detailed analysis may be enabled;

For satisfying needs of providers, the invention further comprises a method or module or a means for:

enabling a customer to send data to provider, e.g. to participate in survey;

handling of mass requests, such as regular updates of data, means for informing users of updated benchmark data as well as of benchmark definition;

accessing measure ID list, what can serve as the basis to identify measures between a customer's business software system and provider;

promoting offering on web pages;

associating measures with standard measure, e.g. to promote offering; enabling of drill-down reporting.

The following section describes examples of possible processes of the exchange of benchmark definitions and/or benchmark data between users of the invention with reference to the figures.

The following steps can be used as building blocks of the benchmark exchange.

| Process 1: | Selection of provider |
| Process 2: | Selection of benchmark package |
| Process 3: | Transfer of benchmark package and update into SEM benchmark storage |
| Process 4: | Customer Participation in benchmark study |

Explanation of Components Used in Flow Description:

| Component | Description |
| --- | --- |
| Measure builder | Measure builder at Customer site |
| BW | Underlying business data information system for a customer business software system |
| XML file containing benchmark data | Document used for seamless exchange of benchmark data between provider and customer and vice versa. |
| Benchmarking Website | Listing of benchmark partner companies including information about their service offering. This sites allows to browse the measure available by each individual provider. Customers can download latest definitions and descriptions of available measures used for benchmarking. |
| Benchmark provider Website | Web-enabled benchmarking application that supports to sign contracts, logon, review offering, check authorization, select benchmark packages, generate XML files, store XML files, download XML files. |
| Customer BS system | Software system of a customer for supporting business processes |
| Customer computer | Computer system, which the customer uses to perform the described actions. |
| Provider computer | Computer system, which the benchmark provider uses to perform the described actions. |

Selection of Provider

Figure 2:
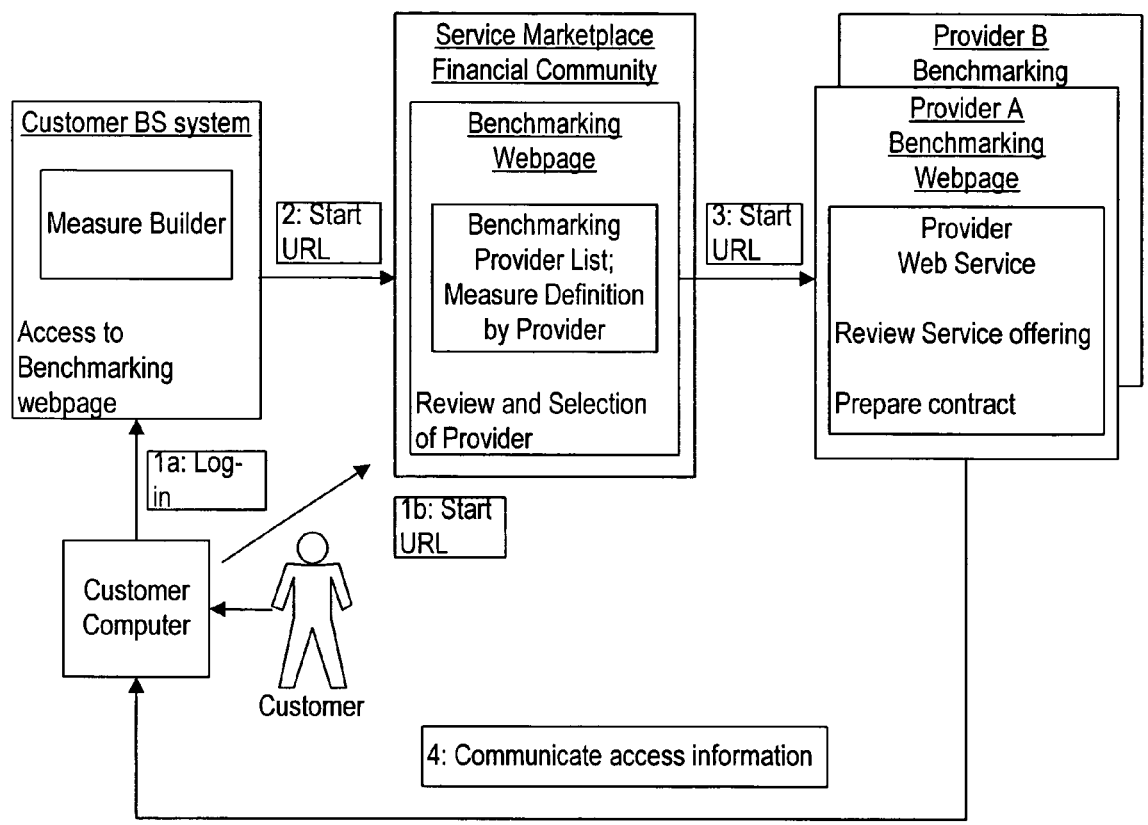
FIG. 2 is an exemplary diagram illustrating a scenario for selecting a benchmark provider.

The steps for this process are described in the following table with reference to FIG. 2.

| Step | Short description | Description and comments |
| --- | --- | --- |
| 1a | Logon | User logon to measure builder. |
| 1b | Access service marketplace | Alternatively, the user accesses the service marketplace. |
| 2 | View list of benchmark providers | The user accesses the service marketplace that includes an additional page for the benchmark topic. Here the user finds a list of benchmark partner companies. Also, a list exists that allows to view measure definitions grouped by each benchmark provider. |
| 3 | Access benchmark provider website | 1. User can review benchmark provider service offering, such as benchmark data subscription, consulting services. This might include viewing of sample data or limited access to benchmark data base. 2. Contract preparation, such as pricing models, up to sign-off of contract |

-continued

| Step | Short description | Description and comments |
|---|---|---|
| 4 | Benchmark access information | Provider informs customer about access details, like user ID's and passwords.<br>Provider informs customer about which benchmark data or definitions he can have access. |

Selection of Benchmark Package

Figure 3:
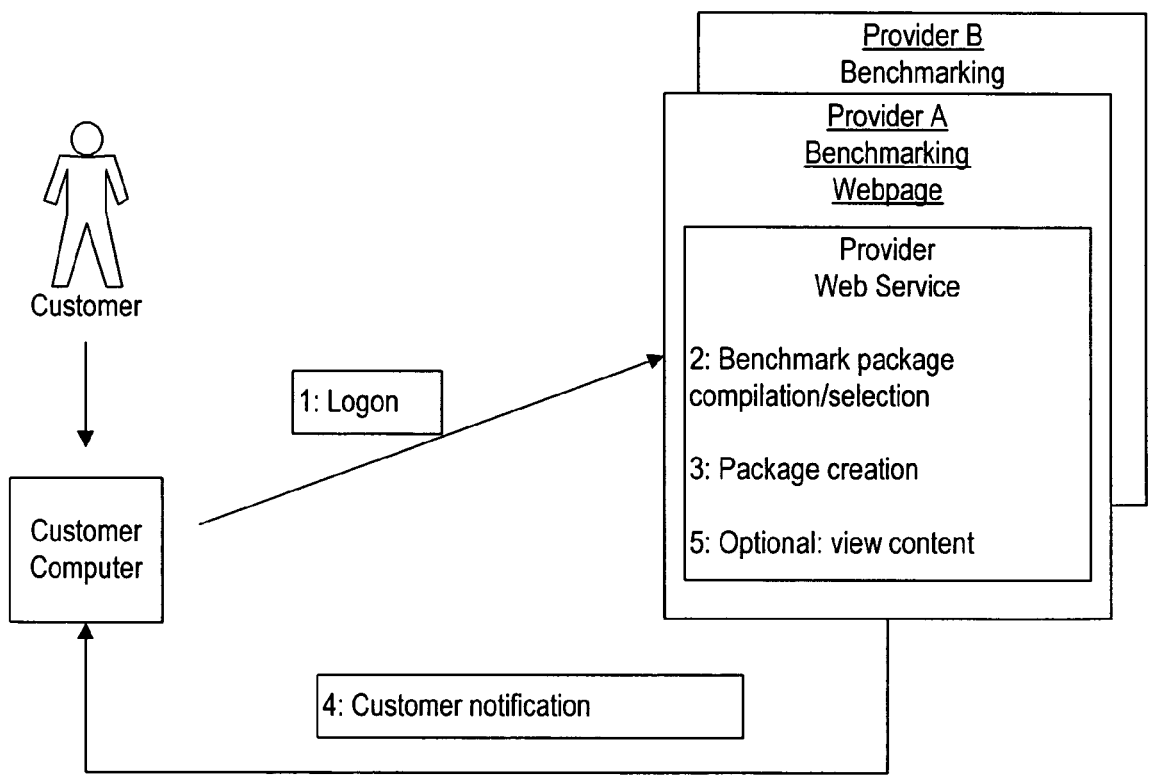
FIG. 3 is an exemplary diagram illustrating a scenario for selecting a benchmark package.

The steps for this process are described in the following table with reference to FIG. 3.

| Step | Short description | Description and comments |
|---|---|---|
| 1 | Logon | Customer logon to provider website and identification through User-ID and password. This logon can be accomplished by using a partner URL directly, but also via a partner link on a third party's benchmarking web page. This benchmarking web page can be accessed directly, from the measure builder. |
| 2 | Benchmark package compilation/selection | Selection of such benchmark package, that are accessible to the customer, that for example includes multiple measures and a given time interval<br>Alternatively, some provider might offer an individual and dynamic measure selection process through their website |
| 3 | Package creation | Benchmark provider creates the requested package (XML file) and stores this on the providers web-site (technically it will be stored on a file server) |
| 4 | Customer notification | Customer will be notified by email when package is ready |
| 5 | Optional: View content | Provider may offer to view the content of the benchmark package (XML-file) directly on their website. |

Transfer of Benchmark Data and Update Benchmark Storage

Customer retrieves benchmark package directly from provider web service. As already described in the selection process, the Customer can access provider's website and choose desired benchmarks, to which he has access according to his identification information from a html page of menu items. After selection, the provider can generate a valid XML document according to the selections of the customer and store this file on a provider fileserver or database.

The customer will then access the file via a provider web service and download the file locally or to customer fileserver.

The invention further provides parsing and viewing capabilities of the file as well as a mechanism to update the data to a benchmark storage by mapping the XML structure to a benchmark data storage.

The software used by customer and provider with respect to this process are designed such that XML structure is reconciled between customer and external provider company, benchmark and measure identifiers are reconciled between customer and external provider company, customer can activate relevant measures in measure builder, customer can selected benchmark package directly on provider's web page, and the provider's software has means to generate requested benchmark package according to XML structure.

A benchmarking service contract may have been put in place between customer and benchmark provider, in order to put the benchmark exchange business on a contractual basis.

In an alternative implementation, a provider may transfer a benchmark file to a file server hosted by a third party. The customer then retrieves data from this fileserver for further processing and updates in a benchmark data storage.

Figure 4:
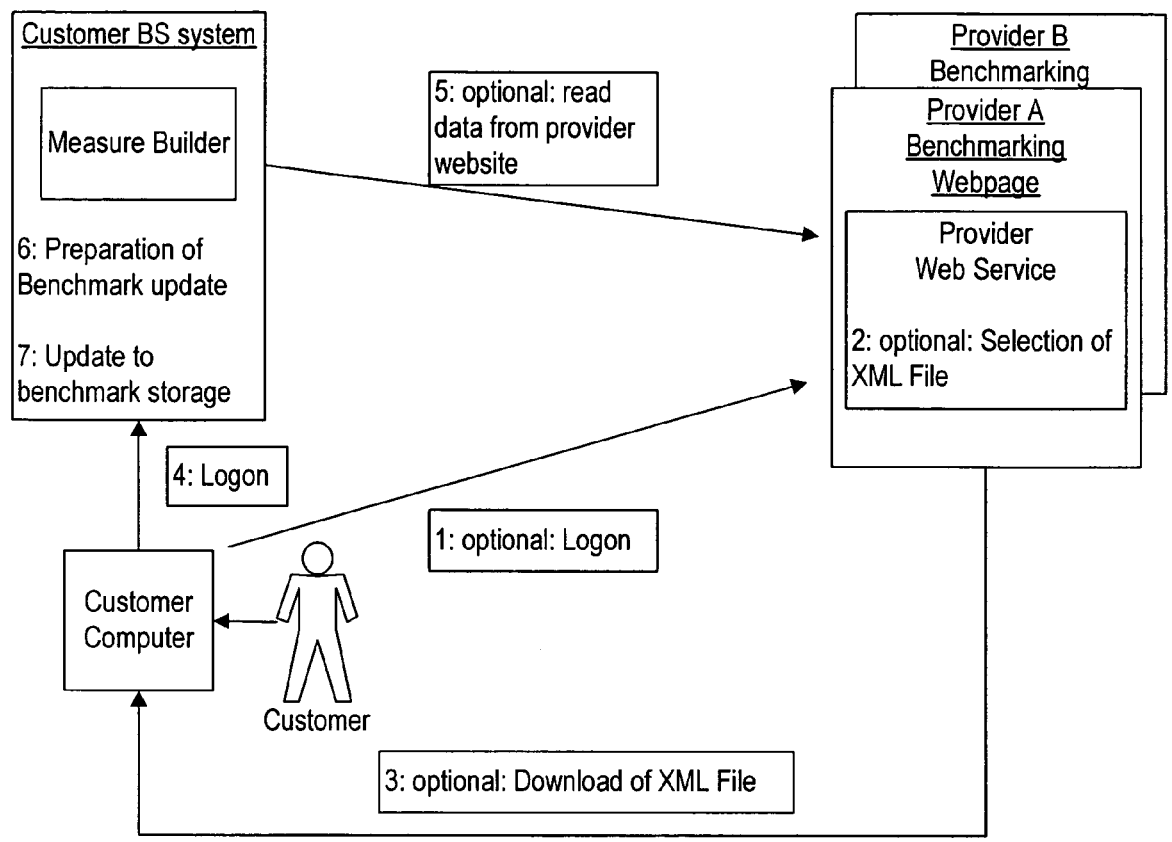
FIG. 4 is an exemplary diagram illustrating a scenario for benchmark retrieval.

The implementation, in which a customer retrieves benchmark package directly from provider web service is described in the following table with reference to FIG. 4.

| Step | Short description | Description and comments |
|---|---|---|
| 1 | Optional step: Logon | Customer logon to provider website and identification through User-ID and password. This logon can be accomplished by using the partner URL directly, but also via the partner link on a third party's benchmarking web page. That benchmarking web page can be accessed directly, from the SEM measure builder or the third party's website. |

-continued

| Step | Short description | Description and comments |
|---|---|---|
| | | This is an optional step as it's not necessary for customer to download XML file from provider web site as upload program can read provider's website directly. |
| 2 | Optional step: Selection of XML-File | Customer selects XML file that contains requested benchmark package comprising benchmark information to which he has access. This may be handled by selecting a file from a list or direct access to the file via an URL that the provider communicated to the customer. The provider may also provide viewing capabilities for the selected package. |
| 3 | Optional step: Download XML File | Customer transfers file to storage location on customer side such as local hard drive or customer network folder. Alternatively, the file could also be sent via a CD or email, depending on the providers offerings. FTP could be used as well. |
| 4 | Logon to SAP SEM | User logon to SAP SEM measure builder. |
| 5 | Optional: read benchmark XML file from provider website | Upload program read benchmark XML file from provider's website, thus user doesn't need to download file. But he must tell the upload program the URL of the benchmark XML file as well as user name and password(if required). |
| 6 | Preparation of benchmark Update | From the measure builder, the upload of the file will be initiated by selecting the file from either the local data storage or URL on provider website. The file may be validated, parsed and mapped to the benchmark data storage structure. benchmark data can be reviewed in order to verify accuracy and relevance prior to update of the benchmark data storage |
| 7 | Update | benchmark data will be updated into the benchmark storage. |

Customer Participation in Benchmark Study

Figure 5:
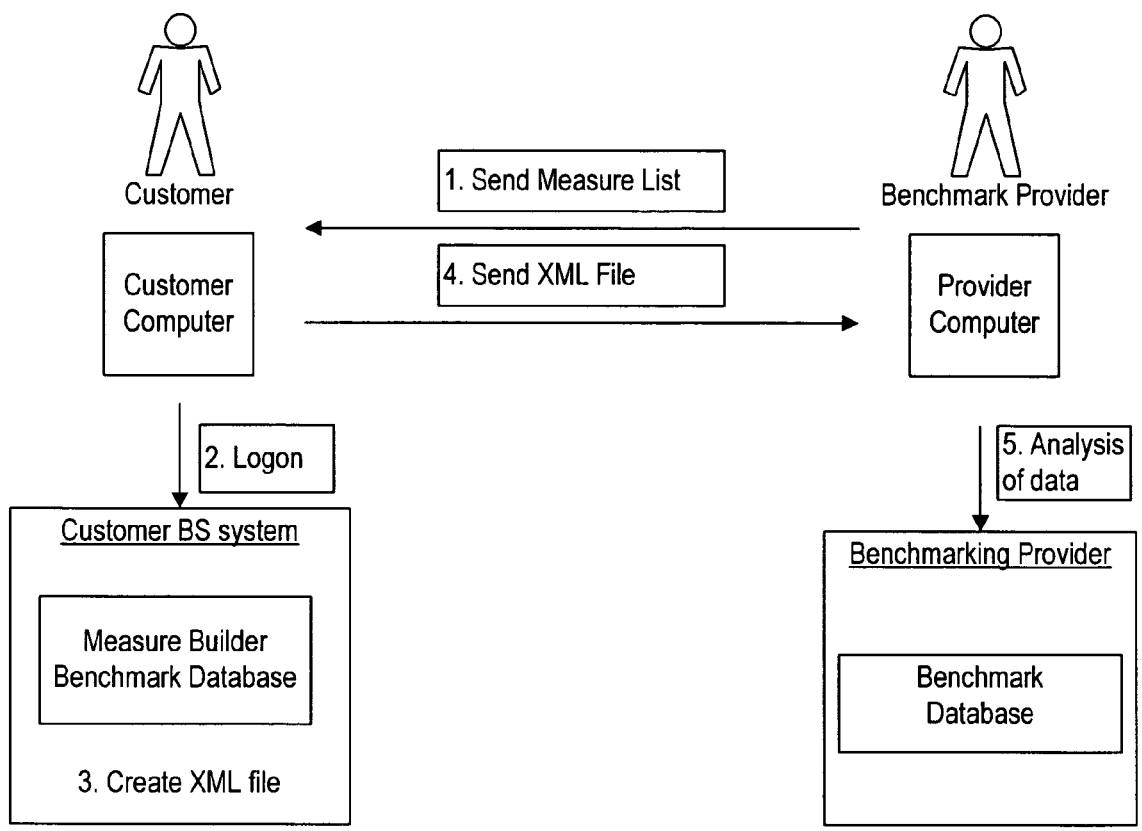
FIG. 5 is an exemplary diagram illustrating a scenario for customer participation in benchmark study.

The steps for this process are described in the following table with reference to FIG. 5.

The participation in a benchmark study may be part of a benchmark provider offering. The benchmark study may be defined as the collection and analysis of data for a certain customer group. Benchmark providers may offer this service to enable direct comparison of customer data against sample data but also to further increase the provider database itself.

A further implementation of the inventive method comprises predefinable query assignment for selectable measures. An assignment of benchmark provider measures to standard measures will allow the customer to use queries for easy data retrieval.

| Step | Short description | Description and comments |
|---|---|---|
| 1 | Send measure List | Benchmark provider can notify customer what measures and benchmark data are required for their study. |
| 2 | Logon SEM system | SEM customer logons SEM system to retrieve data for measures |
| 3 | Create XML file | SEM customer reads data from his benchmark data storage for measures asked by provider and then generates a XML file for results, comprising a section, in which he specifies who has access to what information. |
| 4 | Send XML file | Once XML file created customer can send it to provider via e-mail or ftp. Encryptions is highly recommended. |
| 5 | Analysis of data | Benchmark provider receives data and analysis of data. The result will be written into his own benchmark data base. |

Get Latest Update on Providers Measure Definition

Figure 6:
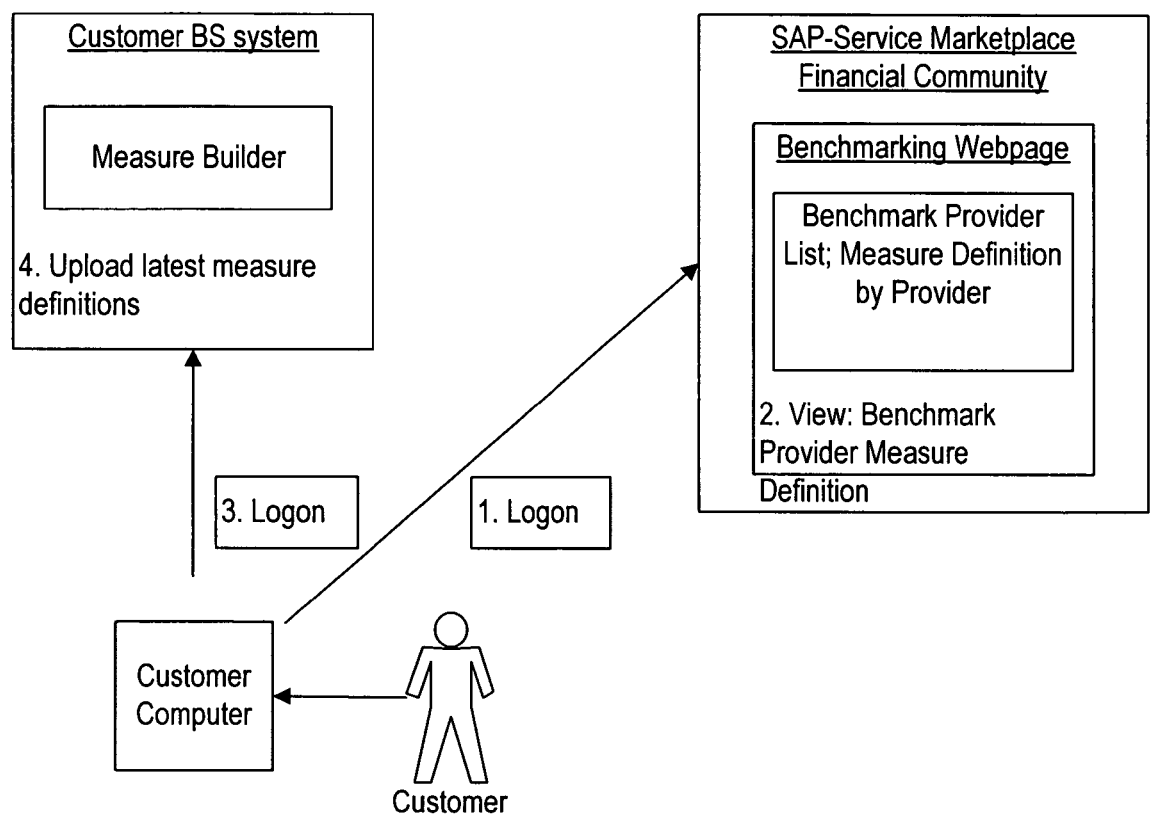
FIG. 6 is an exemplary diagram illustrating a scenario for updating benchmark definition.

The steps for this process are described in the following table with reference to FIG. 6.

| Step | Short description | Description and comments |
|---|---|---|
| 1 | Logon | Customer logon to a financial service marketplace. |
| 2 | View pages | Under financial service page, customer can view e.g.: Benchmark provider list Benchmark provider service offerings Measure definitions of provider |
| 3 | Logon to SEM system | Customer logon to SEM system. |
| 4 | Upload latest measure definitions | Customer startup process from measure builder to upload latest measure definitions into customer measure catalog. All latest measure definitions are contained in a XML file. Upload process reads XML file from financial service marketplace. |

Technical Aspects

The following paragraphs describe various technical design issues as they may apply to the benchmarking scenario.

Benchmark Definition in Measure Builder:

The measure builder serves as the library for benchmark definition. A measure may have the following attributes:
   a technical identifier (ID),
   a short text and/or long text,
   a formula or rule, how it is calculated or calculated from other measures,
   unlimited text description,
   a data source or reference to a data source,
   an assignment to categories, e.g. such as industry or geography.
Measure builder features useful in this context include:
organization of measure hierarchies where measures are linked based on functional areas such as HR, finance and logistic,
link of measures to queries for data retrieval and reporting,
benchmark data reporting based o the benchmark data storage,
ability to apply filter to measures (Filter criteria may be industry, region etc.)

Measures may be grouped into a node within the measure catalog. Measures from benchmark providers may be grouped into dedicated nodes outside a standard measure hierarchy. Those provider measures may carry the same or a similar definition as standard measures. Provider measures may be pointed to standard measures. Benchmark provider measure IDs can be mapped to the technical IDs of measures in the measure builder.

By using data structures, systems and methods according to this invention, a third benchmark provider may provide data for a subset of measures, but may also provide data for measures that are not yet part of the measure builder content or measures that have been added to the provider offering lately.

Benchmarking Web Pages

Benchmarking web page may provide access to provider information such as:
   basic description of service offering,
   URL link to navigate to provider website,
   "latest" measure definitions by individual provider.

Design and technical implementation of those services may be customized by the provider. Technical details may vary between the provider, such as how the XML files are delivered to customer, how the logon is handled and depend largely on solutions already in place and infrastructure considerations on the provider side. However, these details are within the knowledge of person of ordinary skill.

Benchmark Exchange Protocol

According to the present invention, benchmark definitions and data may be exchanged via files in XML format. The XML scheme may be suggested by a customer or a software supplier according to the desired or available structure of the benchmark data storage and reviewed with the benchmark providers. Dimensions such as industry relevance, region, version, and time characteristics may be reflected in the scheme.

Provider Web Service

A provider's web page for exchanging the inventive data structures may offer services like:
   logon handling,
   enabling a customer to select specific or grouped benchmarks for download,
   generating valid XML files according to XML structure,
   filtering, sorting benchmarks,
   Documentation around benchmark service offering.

Import of Benchmark Data

In further implementations of the invention, means are provided for import functionality for:
   validation of benchmark XML document,
   parsing of imported file,
   mapping of data to benchmark data storage,
   viewing capability of imported data prior to posting to benchmark data storage,
   posting of data to benchmark data storage,
   monitoring and logging,
   Error handling.

These capabilities can be accomplished through various combinations of components such as:
   upload programs of economic software applications,
   web application server,
   business connector or other middleware functionality,
   client-side applications (VB or Java),
   browser capabilities, e.g. parsing.

Drill-down reporting in case a first provider will capture only a subset of the data that is generally offered by a second provider.

Further drill-down and additional reporting capabilities might be available on the provider's web page.

Therefore, a drill-down capability into the first provider's web page that allows a customer to navigate to the analytical application of the second provider.

The realization of this capability is handled in several phases. In the first phase, a link to the second provider web page with subsequent logon of the user may be offered. A dynamic link up to a report-to-report interface may be addressed in a second phase. The following sections provide an example of guidelines for implementing the inventive data structure, specifically referring to including benchmark data and benchmark definitions.

The measure builder enables an enterprise using this tool, for example, to upload benchmarks and benchmark data and to compare benchmark data with their own company data. Many benchmark providers in the market do benchmark studies and send study result to their customers. Any benchmark provider, who wants to provide benchmark data that a customer with business software can upload directly into his system to organize his benchmark data in a XML file that follows a structure as designed below.

Structure Outline

Root Element

The root element of the XML document is named as "benchMarkData."

Five parts may be included in the root element:

Memo, Provider, Meta Data, Measure ID and Transaction Data

Memo

Element memo is description for benchmark provider to add notes to this XML document.

Memo is optional element.

Meta Data type is defined by element mdCharacteristic, concrete meta data is defined by element mdCategory.

Provider

Element provider is used to define benchmark provider.

Each Benchmark Data Entry posted into business software system may be identified by benchmark provider.

Here is an example for provider element:

<provider id="FOO" name="Foo company"/>

Value of Attribute "id" identifies provider. Value of attribute "name" is description of provider is optional.

Another usage of provider's id is as prefix to provider measure id, which is explained below in more detail.

Meta Data

Element metaData defines provider meta data, such as a classification standard, for example, and industry categories such as banking, chemical, and education. It is optional for a provider to include meta data in their Benchmark XML file. The following describes how to define a meta data type as well as it's meta data:

```
<metaData>
    ...
    <mdCharacteristic id="0INDUSTRY" name="Industries"/>
        <mdCategory id="BANK" name="Banking"/>
        <mdCategory id="CHEM" name="Chemicals"/>
    ...
    </mdCharacteristic>
    <mdCharacteristic id="0UNIT" name="Unit of measure"/>
    ...
</metaData>
```

-continued

```
<metaData> begins definition of provider meta data.
<mdCharacteristic id="0INDUSTRY" name="Industries"/> begins meta
data entries for a specific meta data type. Value of Attribute "id"
identifies meta data type. Value of attribute "name" is for meta data type
definition, it's optional. For valid meta data type refers to section 2.6.
<mdCategory id="BANK" name="Banking"/> defines one meta
data for the above given meta data type. Value of attribute "id" gives
technical name of meta data; value of attribute "name" is meta
data description.
<mdCategory id="CHEM" name="Chemicals"/> is another
meta data for the above given meta data type.
...
</mdCharacteristic> ends definition of meta data for 0INDUSTRY.
</metaData> ends definition of provider meta data.
```

The meta data types are not random defined. The supported meta data types are listed below.

Measure ID (Identifier)

It's difficult for a provider to define measure id in XML document. If the provider wants to use their own measure id in XML document, then the following steps are advisable:

Send a document including a measure list to a third person who manages measure id.

Said third person give a unique name the benchmark provider as his identifier in element <provider>

Provider's measure are created by adding the unique name as well as two separators '\'., before and after the unique name, thus unique measure name is guaranteed Publish provider measure definition onto a Service Marketplace Customer download provider's measure definition into their SEM system Customer link provider measure to their company measure or Customer activate provider measure as their company measure When generating of benchmark value XML document, define provider's id as the above unique provider name While reference to measure, just use the original measure id.

The reference to measure is defined by element <tdMeasure>.

If you want to refer to a original measure 1001, then define element like: <tdMeasure id="1001">

In some cases provider and customer may achieve agreement to use customer's measure id, for example, customer has one measure 'CUST_0001', then refer to this measure like: <tdMeasure id="CUST_1001" original="N>

Provider's id may be defined as agreed unique name in the second step if it is required to use the original measure id in the XML document.

Name restriction to provider's original measure id may be:

Only alphanumeric and '_' are allowed in measure name, length may be lees than 11.

Transaction Data

Element transactionData contains benchmark data entries to be posted into customer SEM system.

It's advantageous to have at least one entry in transaction data, or else it doesn't make sense to delivery such XML file to customer.

Following pieces show exemplary how to define benchmark data for a measure turn over rate (measure id 1001):

```
                    <transaction Data>
                        <tdMeasure id="1001">
                            <tdCharacteristic id="0CALYEAR">
                                <tdCategory id="1999">
                    <tdCharacteristic id="0BM_S_TYPE">
                        <tdCategory id="GRO">
                        <tdCharacteristic id="0BM_S_RANGE">
                            <tdCategory id="H">
                                <tdValue>
                                    <tdValueItem id="25%">0.159</tdValueItem>
                                    <tdValueItem id="MED">0.22 </tdValueItem>
                                    <tdValueItem id="75%">0.38</tdValueItem>
                                    <unit>%</unit>
                                </tdValue>
                            </tdCategory>
                            <tdCategory id="M">
                            ...
                        ...
                    </tdMeasure>
                ...
            </transactionData>
```

\<transactionData\> begins definition for benchmark data entries.

\<tdMeasure id="1001"\> begins benchmark data entries for measure \FOO\1001

\<tdCharacteristic id="0CALYEAR"\> together with \<tdCategory id="1999"\> defines header meta data calendar year :1999. For valid meta data type refers to section 2.6

\<tdCharacteristic id="OBM_S_TYPE"\> together with \<tdCategory id="GRO"\> defines header meta data company size type: revenue growths.

\<tdCharacteristic id="OBM_S_RANGE"\> together with \<tdCategory id="H"\> defines header meta data company size range: high revenue growths.

\<tdValue\> begins definition of entry items. And up to now we have header data like below:

| Measure ID | Calendar Year | Company size type | Company size range |
|---|---|---|---|
| 0HR_HRMC_006 | 1999 | GRO | H |

\<tdValueItem id="25%"\>0.159\</tdValueItem\> benchmark value 0.159 for benchmark version "25%".

\<tdValueItem id="MED"\>0.22\</tdValueItem\> benchmark value 0.22 for benchmark version "MED".

\<tdValueItem id="75%"\>0.38\</tdValueItem\> benchmark value 0.38 for benchmark version "75%".

\<unit\>%\</unit\> benchmark value unit is %.

\</tdValue\> ends definition of entry items. Up to now we have three entries like below:

| Measure ID | Calendar Year | Company size type | Company size range | Benchmark Version | Unit | Value |
|---|---|---|---|---|---|---|
| 0HR_HRMC_006 | 1999 | GRO | H | 25% | % | 0.159 |
| 0HR_HRMC_006 | 1999 | GRO | H | MED | % | 0.22 |
| 0HR_HRMC_006 | 1999 | GRO | H | 75% | % | 0.38 |

\</tdCategory\>

\<tdCategory id="M"\> begins definition of benchmark data entries that have the same measure id, calendar year, company size type but with different company size range.

...

\</tdMeasure\> ends definition for benchmark data entries for measure 0HR_HRMC_006.

...

\</transactionData\> ends definition for benchmark data entries

Any number of meta data types as many as are needed can be defined for benchmark data entries.

Meta Data Types

In the table below meta data types are listed.

TABLE 1 meta data types

| Meta data type id | Description | Examples |
|---|---|---|
| 0MEASURE | Measure | ROCE; NOPAT; FTE |
| 0BM_VERSION | Benchmark Version | 25% percentile; best in class |
| 0INDUSTRY | Industry | Banking; Education |
| 0COUNTRY | Country | Germany; France |
| 0BM_PROVIDE | Benchmark Value Provider | InfoHRM; PMG; Self |
| 0BM_REGION | Geographic region | Middle Europe; East North Asia |
| 0BM_COMPANY | Company | X; Y; Z |
| 0BM_S_TYPE | Company size type | Revenu; Employee numbers |
| 0BM_S_RANGE | Company size range | 5 m–10 m; 1000–5000 |
| 0UNIT | Unit for measure quantity | %; Ratio |
| 0CURRENCY | Currency for measure amount | USD; DEM; EURO |
| 0CALMONTH2 | Calendar month with two digits | 01; 02; 11 |
| 0CALMONTH | Calendar Year/Month | 200001; 200112 |
| 0CALQUART1 | Calendar quarter with one digit | 1; 2; 3; 4 |
| 0CALQUARTER | Calendar Year/Quarter | 200101; 200102; 200103; 200104 |
| 0CALYEAR | Calendar year with four digits | 2000; 2001 |
| 0FISCPER | Fiscal year period | 2000001; 2001002 |
| 0FISCPER3 | Fiscal year period | 001; 002 |
| 0FISCYEAR | Fiscal Year | 1999; 2000; 2001 |
| 0FISCVARNT | Fiscal Year Variant | K4 |
| 0BM_VALID_F | Benchmark Valid Date From | 20010101 |
| 0BM_VALID_T | Benchmark Valid Date To | 20011231 |

Provider is able to define meta data for all listed meta data types except for the first one 0MEASURE as measure can be defined via Measure Builder.

When defining data entry for benchmark values, meta data may be referenced by different ways:

1. Measures are identified by attribute "id" of element tdMeasure;
2. Benchmark provider is identified by element provider.

3. Units are identified by element;
4. Currencies are identified by element currency;
5. Benchmark versions are identified by attribute "id" of element tdValueItem;
6. For other meta data types, meta data are identified by attribute "id" of both element tdCharacteristic and tdCategory.

Other meta data types may be added.

| Proposed XML schema |
|---|
| ```
<?xml version="1.0" encoding="UTF-8"?>
<xsd:schema xmlns:xsd="http://www.w3.org/2000/10/XMLSchema"
elementFormDefault="qualified">
    <xsd:element name="benchMarkData">
        <xsd:complexType>
            <xsd:sequence>
                <xsd:element ref="memo" minOccurs="0"/>
                <xsd:element ref="provider"/>
                <xsd:element ref="metaData" minOccurs="0"/>
                <xsd:element ref="transactionData"/>
            </xsd:sequence>
            <xsd:attribute name="version" use="default" value="1.0">
                <xsd:simpleType>
                    <xsd:restriction base="xsd:string"/>
                </xsd:simpleType>
            </xsd:attribute>
        </xsd:complexType>
    </xsd:element>
    <xsd:element name="memo">
        <xsd:simpleType>
            <xsd:restriction base="xsd:string">
                <xsd:maxLength value="255"/>
            </xsd:restriction>
        </xsd:simpleType>
    </xsd:element>
    <xsd:element name="provider">
        <xsd:complexType>
            <xsd:attribute name="id" use="required">
                <xsd:simpleType>
                    <xsd:restriction base="xsd:string">
                        <xsd:maxLength value="60"/>
                    </xsd:restriction>
                </xsd:simpleType>
            </xsd:attribute>
            <xsd:attribute name="name" use="optional">
                <xsd:simpleType>
                    <xsd:restriction base="xsd:string">
                        <xsd:maxLengthvalue="60"/>
                    </xsd:restriction>
                </xsd:simpleType>
            </xsd:attribute>
        </xsd:complexType>
    </xsd:element>
    <xsd:element name="metaData">
        <xsd:complexType>
            <xsd:sequence>
                <xsd:element ref="mdCharacteristic" maxOccurs="unbounded"/>
            </xsd:sequence>
        </xsd:complexType>
    </xsd:element>
    <xsd:element name="transactionData">
        <xsd:complexType>
            <xsd:sequence>
                <xsd:element ref="tdMeasure" maxOccurs="unbounded"/>
            </xsd:sequence>
        </xsd:complexType>
    </xsd:element>
    <xsd:element name="mdCharacteristic">
        <xsd:complexType>
            <xsd:sequence>
                <xsd:element ref="mdCategory" maxOccurs="unbounded"/>
            </xsd:sequence>
            <xsd:attribute name="id" use="required">
                <xsd:simpleType>
                    <xsd:restriction base="xsd:string"/>
                </xsd:simpleType>
            </xsd:attribute>
            <xsd:attribute name="name" use="optional">
                <xsd:simpleType>
                    <xsd:restriction base="xsd:string">
                        <xsd:maxLength value="60"/>
``` |

| Proposed XML schema |
|---|
|     </xsd:restriction><br>   </xsd:simpleType><br>  </xsd:attribute><br> </xsd:complexType><br></xsd:element><br><xsd:element name="mdCategory"><br> <xsd:complexType><br>  <xsd:attribute name="id" use="required"><br>   <xsd:simpleType><br>    <xsd:restriction base="xsd:string"><br>     <xsd:maxLength value="60"/><br>    </xsd:restriction><br>   </xsd:simpleType><br>  </xsd:attribute><br>  <xsd:attribute name="name" use="optional"><br>   <xsd:simpleType><br>    <xsd:restriction base="xsd:string"><br>     <xsd:maxLength value="60"/><br>    </xsd:restriction><br>   </xsd:simpleType><br>  </xsd:attribute><br> </xsd:complexType><br></xsd:element><br><xsd:element name="tdMeasure"><br> <xsd:complexType><br>  <xsd:sequence><br>   <xsd:element ref="tdCharacteristic" maxOccurs="unbounded"/><br>  </xsd:sequence><br>  <xsd:attribute name="id" use="required"><br>   <xsd:simpleType><br>    <xsd:restriction base="xsd:string"><br>     <xsd:maxLength value="16"/><br>    </xsd:restriction><br>   </xsd:simpleType><br>  </xsd:attribute><br>  <xsd:attribute name="original" type="xsd:bollean" use="default" value="Y" /><br> </xsd:complexType><br></xsd:element><br><xsd:element name="tdCharacteristic"><br> <xsd:complexType><br>  <xsd:sequence><br>   <xsd:element ref="tdCategory" maxOccurs="unbounded"/><br>  </xsd:sequence><br>  <xsd:attribute name="id" use="required"><br>   <xsd:simpleType><br>    <xsd:restriction base="xsd:string"/><br>   </xsd:simpleType><br>  </xsd:attribute><br> </xsd:complexType><br></xsd:element><br><xsd:element name="tdCategory"><br> <xsd:complexType><br>  <xsd:choice><br>   <xsd:element ref="tdCharacteristic" maxOccurs="unbounded"/><br>   <xsd:element ref="tdValue"/><br>  </xsd:choice><br>  <xsd:attribute name="id" use="required"><br>   <xsd:simpleType><br>    <xsd:restriction base="xsd:string"><br>     <xsd:maxLength value="60"/><br>    </xsd:restriction><br>   </xsd:simpleType><br>  </xsd:attribute><br> </xsd:complexType><br></xsd:element><br><xsd:element name="tdValue"><br> <xsd:complexType><br>  <xsd:sequence><br>   <xsd:element ref="tdValueItem" maxOccurs="unbounded"/><br>   <xsd:choice><br>    <xsd:element ref="unit"/><br>    <xsd:element ref="currency"/><br>   </xsd:choice><br>   <xsd:element ref="sample" minOccurs="0"/><br>   <xsd:element ref="sampleDateFrom" minOccurs="0"/><br>   <xsd:element ref="sampleDateTo" minOccurs="0"/><br>  </xsd:sequence> |

| -continued |
|---|
| Proposed XML schema |

```
      </xsd:complexType>
   </xsd:element>
   <xsd:element name="tdValueItem">
      <xsd:complexType>
         <xsd:simpleContent>
            <xsd:extension base="xsd:float">
               <xsd:attribute name="id" use="required">
                  <xsd:simpleType>
                     <xsd:restriction base="xsd:string">
                        <xsd:maxLength value="60"/>
                     </xsd:restriction>
                  </xsd:simpleType>
               </xsd:attribute>
            </xsd:extension>
         </xsd:simpleContent>
      </xsd:complexType>
   </xsd:element>
   <xsd:element name="sample" type="xsd:decimal"/>
   <xsd:element name="sampleDateFrom" type="xsd:date"/>
   <xsd:element name="sampleDateTo" type="xsd:date"/>
   <xsd:element name="unit">
      <xsd:simpleType>
         <xsd:restriction base="xsd:string">
            <xsd:maxLength value="60"/>
         </xsd:restriction>
      </xsd:simpleType>
   </xsd:element>
   <xsd:element name="currency">
      <xsd:simpleType>
         <xsd:restriction base="xsd:string">
            <xsd:maxLength value="60"/>
         </xsd:restriction>
      </xsd:simpleType>
   </xsd:element>
</xsd:schema>
```

Class Diagram for XML Schema

Figure 7:
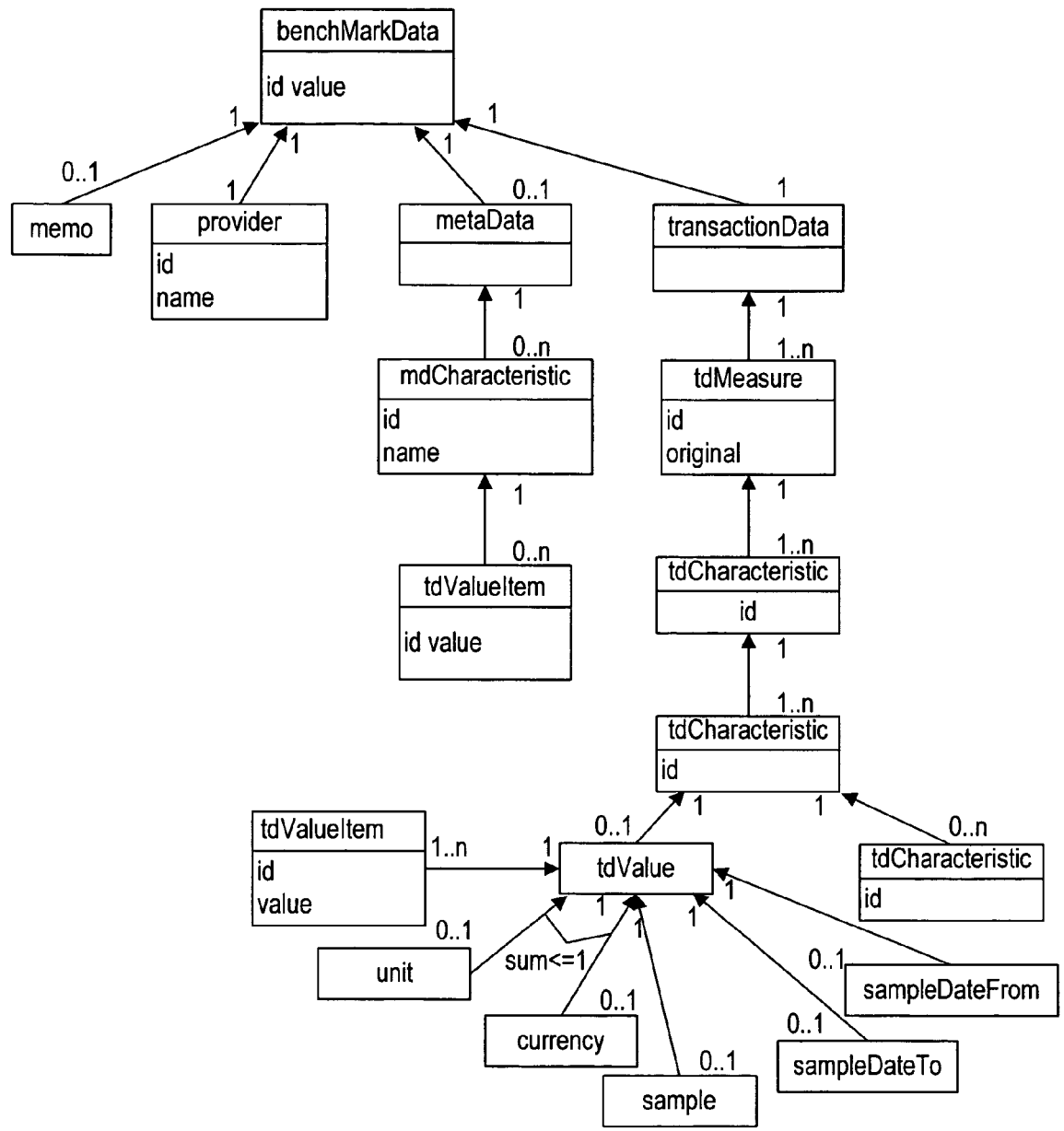
FIG. 7 is an exemplary diagram illustrating a relationship among different elements of an electronic data structure.

The illustration in FIG. 7 shows a relation among different elements.

Sample XML File for the Proposal

```
<?xml version="1.0"?>
<benchMarkData version="1.0" xmlns:xsi="http://www.w3.org/2000/10/XMLSchema-instance"
xsi:noNamespaceSchemaLocation="BenchmarkData.xsd">
   <memo>This package contains HR BenchmarkData.</memo>
   <provider id="FOO" name="Foo company"/>
   <metaData>
      <mdCharacteristic id="0UNIT" name="Unit">
         <mdCategory id="%" name="Percentages"/>
      </mdCharacteristic>
      <mdCharacteristic id="0CURRENCY" name="Currency">
         <mdCategory id="USD" name="American Dollars"/>
      </mdCharacteristic>
      <mdCharacteristic id="0BM_S_TYPE" name="Company Size Types">
         <mdCategory id="001" name="Revenue Growths"/>
         <mdCategory id="002" name="Number of Employees"/>
      </mdCharacteristic>
      <mdCharacteristic id="0BM_S_RANGE" name="Comapny Size Ranges">
         <mdCategory id="HIGH" name="High Revenue Growths"/>
         <mdCategory id="MED" name="Medium Revenue Growths"/>
         <mdCategory id="LOW" name="Low Revenue Growths"/>
         <mdCategory id="500" name="1-500 employees"/>
         <mdCategory id="1000" name="501-1,000 employees"/>
         <mdCategory id="2000" name="1,001-2,000 employees"/>
         <mdCategory id="2000+" name="more than 2000+ employees"/>
      </mdCharacteristic>
      <mdCharacteristic id="0INDUSTRY" name="Industries">
         <mdCategory id="ALL" name="All industries"/>
         <mdCategory id="BANK" name="Banking"/>
         <mdCategory id="CHEM" name="Chemicals"/>
```

-continued

```xml
      </mdCharacteristic>
      <mdCharacteristic id="0BM_VERSION" name="Benchmark versions">
        <mdCategory id="25%" name="25th Percentile"/>
        <mdCategory id="MED" name="Median"/>
        <mdCategory id="75%" name="75th Percentile"/>
      </mdCharacteristic>
  </metaData>
  <transactionData>
    <tdMeasure id="1001">
      <tdCharacteristic id="0CALYEAR">
        <tdCategory id="1999">
          <tdCharacteristic id="0BM_S_TYPE">
            <tdCategory id="001">
              <tdCharacteristic id="0BM_S_RANGE">
                <tdCategory id="HIGH">
                  <tdValue>
                    <tdValueItem id="25%">0.159</tdValueItem>
                    <tdValueItem id="MED">0.22</tdValueItem>
                    <tdValueItem id="75%">0.38</tdValueItem>
                    <unit>%</unit>
                  </tdValue>
                </tdCategory>
                <tdCategory id="MED">
                  <tdValue>
                    <tdValueItem id="25%">0.111</tdValueItem>
                    <tdValueItem id="MED">0.165</tdValueItem>
                    <tdValueItem id="75%">0.252</tdValueItem>
                    <unit>%</unit>
                  </tdValue>
                </tdCategory>
              </tdCharacteristic>
            </tdCategory>
            <tdCategory id="002">
              <tdCharacteristic id="0BM_S_RANGE">
                <tdCategory id="500">
                  <tdValue>
                    <tdValueItem id="25%">0.159</tdValueItem>
                    <tdValueItem id="MED">0.1825</tdValueItem>
                    <tdValueItem id="75%">0.2535</tdValueItem>
                    <unit>%</unit>
                  </tdValue>
                </tdCategory>
                <tdCategory id="1000">
                  <tdValue>
                    <tdValueItem id="25%">0.113</tdValueItem>
                    <tdValueItem id="MED">0.169</tdValueItem>
                    <tdValueItem id="75%">0.302</tdValueItem>
                    <unit>%</unit>
                  </tdValue>
                </tdCategory>
              </tdCharacteristic>
            </tdCategory>
          </tdCharacteristic>
          <tdCharacteristic id="0INDUSTRY">
            <tdCategory id="BANK">
              <tdValue>
                <tdValueItem id="25%">0.217</tdValueItem>
                <tdValueItem id="MED">0.279</tdValueItem>
                <tdValueItem id="75%">0.333</tdValueItem>
                <unit>%</unit>
              </tdValue>
            </tdCategory>
            <tdCategory id="CHEM">
              <tdValue>
                <tdValueItem id="25%">0.054</tdValueItem>
                <tdValueItem id="MED">0.146</tdValueItem>
                <tdValueItem id="75%">0.172</tdValueItem>
                <unit>%</unit>
              </tdValue>
            </tdCategory>
          </tdCharacteristic>
        </tdCategory>
      </tdCharacteristic>
    </tdMeasure>
    <tdMeasure id="CUST_0002" original="N">
      <tdCharacteristic id="0CALYEAR">
```

-continued

```xml
<tdCategory id="1999">
  <tdCharacteristic id="0BM_S_TYPE">
    <tdCategory id="001">
      <tdCharacteristic id="0BM_S_RANGE">
        <tdCategory id="HIGH">
          <tdValue>
            <tdValueItem id="25%">0.159</tdValueItem>
            <tdValueItem id="MED">0.22</tdValueItem>
            <tdValueItem id="75%">0.38</tdValueItem>
            <unit>%</unit>
          </tdValue>
        </tdCategory>
        <tdCategory id="MED">
          <tdValue>
            <tdValueItem id="25%">0.111</tdValueItem>
            <tdValueItem id="MED">0.165</tdValueItem>
            <tdValueItem id="75%">0.252</tdValueItem>
            <unit>%</unit>
          </tdValue>
        </tdCategory>
      </tdCharacteristic>
    </tdCategory>
    <tdCategory id="002">
      <tdCharacteristic id="0BM_S_RANGE">
        <tdCategory id="500">
          <tdValue>
            <tdValueItem id="25%">0.159</tdValueItem>
            <tdValueItem id="MED">0.1825</tdValueItem>
            <tdValueItem id="75%">0.2535</tdValueItem>
            <unit>%</unit>
          </tdValue>
        </tdCategory>
        <tdCategory id="1000">
          <tdValue>
            <tdValueItem id="25%">0.113</tdValueItem>
            <tdValueItem id="MED">0.169</tdValueItem>
            <tdValueItem id="75%">0.302</tdValueItem>
            <unit>%</unit>
          </tdValue>
        </tdCategory>
      </tdCharacteristic>
    </tdCategory>
  </tdCharacteristic>
  <tdCharacteristic id="0INDUSTRY">
    <tdCategory id="BANK">
      <tdValue>
        <tdValueItem id="25%">0.217</tdValueItem>
        <tdValueItem id="MED">0.279</tdValueItem>
        <tdValueItem id="75%">0.333</tdValueItem>
        <unit>%</unit>
      </tdValue>
    </tdCategory>
    <tdCategory id="CHEM">
      <tdValue>
        <tdValueItem id="25%">0.054</tdValueItem>
        <tdValueItem id="MED">0.146</tdValueItem>
        <tdValueItem id="75%">0.172</tdValueItem>
        <unit>%</unit>
      </tdValue>
    </tdCategory>
  </tdCharacteristic>
</tdCategory>
</tdCharacteristic>
</tdMeasure>
</transactionData>
</benchMarkData>
```

Processors suitable for the execution of a computer program include, by way of example, both general and special purpose microprocessors, and any one or more processors of any kind of digital computer. Generally, a processor will receive instructions and data from a read-only memory, a random access memory, or both. The essential elements of a computer are a processor for executing instructions and one or more memory devices for storing instructions and data. Generally, a computer will also include, or be operatively coupled to receive data from and/or transfer data to one or more mass storage devices (storage means) for storing data. Storage means include magnetic, magneto-optical disks, or optical disks.

Information carriers suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interactions with a user, the invention can be implemented on a computer system having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interactions with a user as well. For example, feedback provided to the user can be any form of sensory feedback, such as visual feedback, auditory feedback, or haptic feedback. Input from the user can be received in any form, including acoustic, speech, or haptic input.

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM. It is intended that the specification and examples be considered as exemplary only, with a true scope and spirit of the invention being indicated by the following claims.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing an electronic data structure by using one or more processes running in a computer system of a first party, comprising:
    selecting benchmark information stored in a resource or database;
    selecting identification information for controlling access to the benchmark information;
    storing the selected benchmark information, an entity associated with the selected benchmark information, and the selected identification information in said electronic data structure, wherein the selected identification information comprises data specifying a parent entity having access to the selected benchmark information associated with the entity and wherein the entity is a child entity of the parent entity;
    receiving a request to access the selected benchmark information, the request including identification information of a second party; and
    granting access to the selected benchmark information to the second party when the identification information of the second party matches the selected identification information included in the electronic data structure.

2. The method of claim 1, further comprising:
presenting the electronic data structure to the second party.

3. The method of claim 1, further comprising:
presenting the electronic data structure to second parties by electronic means.

4. The method of claim 1, further comprising:
updating the resource or database with benchmark information.

5. The method of claim 3, further comprising:
encrypting the electronic data structure prior to presenting.

6. The method of claim 3, further comprising:
stripping off personally identifiable information contained in the electronic data structure prior to presenting.

7. The method of claim 1, further comprising:
    receiving a request for a benchmark information from the second party, said request including the identification information of said second party;
    determining whether the requested benchmark information is contained in said electronic data structure and whether the identification information of the second party is contained in an authorizing section of the electronic data structure; and
    presenting the requested benchmark information to the second party when the determination indicates that the requested benchmark information is contained in said electronic data structure and the identification information is contained in the authorizing section of the electronic data structure.

8. A computer system for processing an electronic data structure by using one or more processes running in a computer system of a first party, comprising:
    memory having program instructions;
    input means for entering data;
    storage means for storing data;
    a processor responsive to the program instructions to:
        select a benchmark information stored in a resource or database, and an identification information for controlling access to the benchmark information;
        store the selected benchmark information, an entity associated with the selected benchmark information, and the selected identification information in said electronic data structure, wherein the selected identification information comprises data specifying a parent entity having access to selected benchmark information associated with the entity and wherein the entity is a child entity of the parent entity;
        receive a request to access the selected benchmark information, the request including identification information of a second party; and
        grant access to the selected benchmark information to the second party when the identification information of the second party matches the selected identification information included in the electronic data structure.

9. The computer system of claim 8, further comprising:
instructions for presenting the electronic data structure to the second party.

10. The computer system of claim 8, further comprising:
instructions for presenting the electronic data structure to second parties by electronic means.

11. The computer system of claim 8, further comprising:
updating the resource or database with benchmark information.

12. The computer system of claim 9, further comprising:
instructions for encrypting the electronic data structure prior to presenting.

13. The computer system of claim 9, further comprising:
instructions for stripping off personally identifiable information contained in the electronic data structure prior to presenting.

14. The computer system of claim 8, further responsive to the program instructions to:
receiving receive a request for a benchmark information from the second party, said request including the identification information of said second party;
determine whether the requested benchmark information is contained in said electronic data structure and whether the identification information of the second party is contained in an authorizing section of the electronic data structure; and
present the requested benchmark information to the second party when the determination indicates that the requested benchmark information is contained in said electronic data structure and the identification information is contained in the authorizing section of the electronic data structure.

15. A computer-readable storage device storing instructions for processing an electronic data structure by using one or more processes running in a computer system of a first party according to a method, the method comprising:
selecting a benchmark information stored in a resource or database, and an identification information for controlling access to the benchmark information;
storing the selected benchmark information, an entity associated with the selected benchmark information, and the selected identification information in said electronic data structure, wherein the selected identification information comprises data specifying a parent entity having access to selected benchmark information associated with the entity and wherein the entity is a child entity of the parent entity;
receiving a request to access the selected benchmark information, the request including identification information of a second party; and
granting access to the selected benchmark information to the second party when the identification information of the second party matches the selected identification information included in the electronic data structure.

16. The computer-readable storage device of claim 15, the method further comprising:
presenting the electronic data structure to the second party.

17. The computer-readable storage device of claim 15, the method further comprising:
presenting the electronic data structure to second parties by electronic means.

18. The computer-readable storage device of claim 15, the method further comprising:
updating the resource or database with benchmark information.

19. The computer-readable storage device of claim 16, the method further comprising:
encrypting the electronic data structure prior to presenting.

20. The computer-readable storage device of claim 16, the method further comprising:
stripping off personally identifiable information contained in the electronic data structure prior to presenting.

21. The computer-readable storage device of claim 15, the method further comprising:
receiving a request for a benchmark information from the second party, said request including the identification information of said second party;
determining whether the requested benchmark information is contained in said electronic data structure and whether the identification information of the second party is contained in an authorizing section of the electronic data structure; and
presenting the requested benchmark information to the second party when the determination indicates that the requested benchmark information is contained in said electronic data structure and the identification information is contained in the authorizing section of the electronic data structure.

22. The method of claim 1, further comprising:
storing an authorized content section in said electronic data structure, wherein the authorized content section specifies the benchmark information that is accessible by the entity.

23. The computer system of claim 8, the processor is further responsive to the program instructions to:
store an authorized content section in said electronic data structure, wherein the authorized content section specifies the benchmark information that is accessible by the entity.

24. The computer-readable storage device of claim 15, the method further comprising:
storing an authorized content section in said electronic data structure, wherein the authorized content section specifies the benchmark information that is accessible by the entity.

* * * * *